(12) United States Patent
Pope et al.

(10) Patent No.: US 7,720,787 B2
(45) Date of Patent: May 18, 2010

(54) INTELLIGENCE ANALYSIS METHOD AND SYSTEM USING SUBJECTIVE LOGIC

(75) Inventors: Simon Kevin John Pope, Mawson Lakes (AU); Audun Jøsang, Queensland (AU); David Scott McAnally, Queensland (AU); Rayma Judith McAnally, legal representative, The Gap (AU)

(73) Assignee: Distip Pty Limited, Varsity Lake Old (AU)

( * ) Notice: Subject to any disclaimer, the term of this patent is extended or adjusted under 35 U.S.C. 154(b) by 494 days.

(21) Appl. No.: 11/423,436

(22) Filed: Jun. 10, 2006

(65) Prior Publication Data
US 2007/0288418 A1 Dec. 13, 2007

(51) Int. Cl.
G06F 17/00 (2006.01)
(52) U.S. Cl. .......................................... 706/53; 706/52
(58) Field of Classification Search .................. 706/53, 706/52
See application file for complete search history.

(56) References Cited

U.S. PATENT DOCUMENTS

2002/0103776 A1* 8/2002 Bella et al. ..................... 706/49
2007/0005520 A1* 1/2007 Eick et al. ..................... 706/12

OTHER PUBLICATIONS

"Analysis of Competing Hypotheses using Subjective Logic", Simon Pope, Audun Josang, 10th International Command & Control Research & Technology Symposium, Ft. Belvoir Defense Technical Information Center, Jun. 2005.*

"Chapter 8: Analysis of Competing Hypotheses", Richards J. Heuer, Jr., Psychology of Intelligence Analysis, 1999.*

"Legal Reasoning with subjective logic", Audun Josang, Viggo A. Bondi, Artificial Intelligence and Law, vol. 6, No. 4, Dec. 2000, pp. 289-315.*

Josang, A. et al., *Legal Reasoning With Subjective Logic*, Artificial Intelligence and Law, 2000, pp. 289-315.

* cited by examiner

Primary Examiner—David R Vincent
Assistant Examiner—Mai T Tran
(74) Attorney, Agent, or Firm—Alston & Bird LLP

(57) ABSTRACT

Method of and system for analysing a set of exhaustive and exclusive hypotheses, including assessing and assigning base rates for each hypothesis; determining a set of items of evidence that are relevant to, have a causal influence on, or would disconfirm more than one hypothesis; assessing and assigning base rates for each item of evidence; deciding, for each item of evidence, whether the item should be treated as being a causal influence or diagnostic indicator with respect to the set of the hypotheses; if the item of evidence is to be treated as a causal influence—making a judgement as to the likelihood of each hypothesis, both if the evidence were true, and also if the evidence were false; if the item of evidence is to be treated as a diagnostic indicator—making a judgement as to the evidence being true if the hypothesis were true; assessing the belief for each item of evidence being true; deciding a set of interim beliefs in each hypothesis for each individual item of evidence by:
  employing a conditional inference operator for evidence that is to be treated as a causal influence; and
  employing a reverse conditional inference operator for evidence that is to be treated as a diagnostic indicator; and
deciding the overall belief in each hypothesis by employing a consensus operator on the respective set of interim beliefs.

21 Claims, 10 Drawing Sheets

| Likelihood Categories | | Absolutely 1 | Very Likely 2 | Likely 3 | Somewhat Likely 4 | Chances about even 5 | Somewhat Unlikely 6 | Unlikely 7 | Very Unlikely 8 | Absolutely Not 9 |
|---|---|---|---|---|---|---|---|---|---|---|
| Certainty Categories | E | Completely Uncontain | 1E | 2E | 3E | 4E | 5E | 6E | 7E | 8E | 9E |
| | D | Very Uncertain | 1D | 2D | 3D | 4D | 5D | 6D | 7D | 8D | 9D |
| | C | Uncertain | 1C | 2C | 3C | 4C | 5C | 6C | 7C | 8C | 9C |
| | B | Slightly Uncertain | 1B | 2B | 3B | 4B | 5B | 6B | 7B | 8B | 9B |
| | A | Completely Certain | 1A | 2A | 3A | 4A | 5A | 6A | 7A | 8A | 9A |

40

|  | $h_1$ $br(h_1)$ | $h_2$ $br(h_2)$ | $h_3$ $br(h_3)$ |
|---|---|---|---|
| $e_1$ | $\omega_{e_1\mid h_1}$ | $\omega_{e_1\mid h_2}$ | $\omega_{e_1\mid h_3}$ |
| $e_2$ | $\omega_{h_1\mid e_2}$ $\omega_{h_1\mid \bar{e}_2}$ | $\omega_{(h_2\vee h_3)\mid e_2}$ $\omega_{(h_2\vee h_3)\mid \bar{e}_2}$ | |
| $e_3$ | $\omega_{h_1\mid e_3}$ $\omega_{h_1\mid \bar{e}_3}$ | $\omega_{h_2\mid e_3}$ $\omega_{h_2\mid \bar{e}_3}$ | $\omega_{h_3\mid e_3}$ $\omega_{h_3\mid \bar{e}_3}$ |

FIG. 10A

|  | $h_1$ $br(h_1)$ | $h_2$ $br(h_2)$ | $h_3$ $br(h_3)$ |
|---|---|---|---|
| $e_1$ | $\omega_{e_1\mid h_1}$ $\omega_{e_1\mid \bar{h}_1}$ | $\omega_{e_1\mid h_2}$ $\omega_{e_1\mid \bar{h}_2}$ | $\omega_{e_1\mid h_3}$ $\omega_{e_1\mid \bar{h}_3}$ |
| $e_2$ | $\omega_{h_1\mid e_2}$ $\omega_{h_1\mid \bar{e}_2}$ | $\omega_{h_2\mid e_2}$ $\omega_{h_2\mid \bar{e}_2}$ | $\omega_{h_3\mid e_2}$ $\omega_{h_3\mid \bar{e}_2}$ |
| $e_3$ | $\omega_{h_1\mid e_3}$ $\omega_{h_1\mid \bar{e}_3}$ | $\omega_{h_2\mid e_3}$ $\omega_{h_2\mid \bar{e}_3}$ | $\omega_{h_3\mid e_3}$ $\omega_{h_3\mid \bar{e}_3}$ |

FIG. 10B

INTELLIGENCE ANALYSIS METHOD AND SYSTEM USING SUBJECTIVE LOGIC

BACKGROUND OF THE INVENTION

1. Field of the Invention

The present invention relates to a method for analysis of competing hypotheses. In particular, although not exclusively, the invention provides a method for the analysis of intelligence, wherein intelligence deals with all the things which should be known in advance of initiating a course of action.

2. Discussion of the Background Art

Intelligence analysis is a complicated task that requires a high degree of analytical judgement under conditions of considerable uncertainty. This judgement is used to fill in the gaps in knowledge and is the analyst's principal means of managing uncertainty. Much of intelligence analysis includes judging the relevance and the value of evidence to determine the likelihood of competing hypotheses.

Intelligence is a difficult term to define precisely, yet its role and importance can be both intuitively understood and appreciated. From one perspective it may be seen as an end product, i.e. 'information' that is used to enhance or aid a decision making process. From another perspective, it may refer to the process that is applied to information, in order to transform it into a more useful product. More importantly than what intelligence is perhaps, is what intelligence does. Intelligence, both as a product and a process, is a means by which better decisions can be made, based on an increased understanding of likely courses of action, their influences and their consequences.

In everyday personal affairs few of our decisions use any directed analytical processes, and even fewer of these require any sort of rigorous approach. Arguably this is due to relatively minor consequences of the decisions we face in such everyday affairs. The same is not true for large-scale human affairs, such as the business of nations and corporations, where the complexity of the environment and the relative consequences of decisions can have enormous impact on the well-being and survival of a nation's citizenry or a corporation's ability to compete. This distinction in and of itself is cause enough to consider whether human 'everyday reasoning' is robust and reliable enough for use in these larger contexts.

As it happens, humans typically systematically make substantive errors in reasoning due to problems of framing, resistance of mental models to change, risk aversion, limitations of short-term memory, and other cognitive and perceptual biases. This has severe implications for the process of intelligence analysis, and may lead to incorrect conclusions, especially in situations that appear familiar but which actually result in different outcomes; in situations where the gradual assimilation of information into established mental models results in the failure to detect 'weak signals' that should have triggered a major re-evaluation; and in situations where the complexity of the mental models are untenable due to human limitations of short-term memory.

When applied to the business of nation states, the consequences of intelligence failure can be disastrous, so much so that the recorded history of the world, both ancient and modern, is replete with a litany of devastating intelligence failures too numerous to list. Examples of these failure are easily found in any period of history, such as the failure of the United States during World War 2 to perceive an impending attack on Pearl Harbour and the failure of Japan to reason that Midway Island was a trap, with the consequent sinking of four Japanese aircraft carriers and the loss of all crews, aircrews and aircraft. It is therefore foolhardy to believe that good intelligence can be developed by relying solely on human cognition without resort to products, methodologies or frameworks that attempt to augment human cognition while also mitigating its defects.

Intelligence analysis generally requires that analysts choose from among several alternative hypotheses in order to present the most plausible of these as likely explanations or outcomes for the evidence being analyzed. Analysts that do not use some form of rigorous methodology will often work intuitively to identify what they believe to be the most likely explanation and then work backwards, using a satisficing approach where the 'correct' explanation is the first one that is consistent with the evidence. The major downfall of the satisficing approach is that there may be more than one explanation that is consistent with the evidence, and unless the analyst evaluates every reasonable alternative, they may arrive at an incorrect conclusion.

Other common problems with using this strategy include the failure to generate appropriate alternative hypotheses; the propensity to filter and interpret the evidence to support the conclusions; and the failure to consider the diagnosticity of the evidence and how well it differentiates between hypotheses. The recognition of these problems with their disastrous consequences has led to the development of Alternative Analysis techniques that are widely employed, for example, within the intelligence services, see R. J. Heuer, *Psychology of Intelligence Analysis*. Washington, D.C.: Central Intelligence Agency Center for the Study of Intelligence, 1999. [Online] Available: http://www.cia.gov/csi/books/19104.

Other strategies that are less commonly used in intelligence analysis and are also ineffective are discussed in detail by George, A.; *Presidential Decisionmaking in Foreign Policy: The Effective Use of Information and Advice*. Boulder Colo., USA: Westview Press, 1980. Many alternative analysis techniques attempt to address the problems of fixed mind-sets and incomplete generation of alternative hypotheses, while still others attempt to address the problems of reasoning about the alternative hypotheses, such as R. Z. George, *Fixing the problem of analytical mind-sets: Alternative analysis*, International Journal of Intelligence and Counter Intelligence, vol. 17, no. 3, pp. 385-405, Fall 2004.

One way in which some of the problems of reasoning about alternative hypotheses could be addressed is to require the analyst to simultaneously evaluate all reasonable hypotheses and reach conclusions about their relative likelihood, based on the evidence provided. However, simultaneous evaluation of all non-trivial problems is a near-impossible feat for human cognition alone. Recent research suggests the number of individual variables we can mentally handle while trying to solve a problem is relatively small, four (4) variables are difficult, while five (5) are nearly impossible according to G. S. Halford, R. Baker, J. E. McCredden, and J. D. Bain, *How many variables can humans process*? Psychological Science, vol. 16, no. 1, pp. 70-76, January 2005. The Analysis of Competing Hypotheses (ACH) Heuer op cit was developed to provide a framework for assisted reasoning that would help overcome these limitations.

Heuer's Analysis of Competing Hypotheses (ACH)

The ACH methodology was developed in the mid- to late-1970's by Richard Heuer, a former CIA Directorate of Intelligence methodology specialist, in response to his never-ending quest for better analysis. The ACH methodology is still considered to be highly relevant today, see F. J. Stech and C. Elässer, *Midway revisited: Deception by analysis of compet-*

*ing hypothesis*, MITRE Corporation, Tech. Rep., 2004. [Online] Available: http://www.mitre.org/work/tech papers/tech papers 04/stech deception. ACH typically consists of the following eight steps:

1) Identify the possible hypotheses to be considered, for example use a group of analysts with different perspectives to brainstorm the possibilities.
2) Make a list of significant evidence and arguments for and against each hypothesis.
3) Prepare a matrix with hypotheses across the top and evidence down the side. Analyze the "diagnosticity" of the evidence and arguments—that is, identify which items are most helpful in judging the relative likelihood of the hypotheses.
4) Refine the matrix. Reconsider the hypotheses and delete evidence and arguments that have no diagnostic value.
5) Draw tentative conclusions about the relative likelihood of each hypothesis. Proceed by trying to disprove the hypotheses rather than prove them.
6) Analyze how sensitive your conclusion is to a few critical items of evidence. Consider the consequences for your analysis if that evidence were wrong, misleading, or subject to a different interpretation.
7) Report conclusions. Discuss the relative likelihood of all the hypotheses, not just the most likely one.
8) Identify milestones for future observation that may indicate events are taking a different course than expected.

These eight steps are intended to provide a basic framework for identification of assumptions, arguments and hypotheses; consideration of all evidence and hypotheses, including its value relative to the hypotheses; a method of disconfirmation for identifying the most likely hypotheses; an approach to reporting the results of the analysis; and an approach to detecting future changes in the outcomes.

In simple terms, ACH requires the analyst to simultaneously evaluate all reasonable hypotheses and reach conclusions about their relative likelihood, based on the evidence provided. Heuer acknowledges that while this holistic approach will not always yield the right answer, it does provide some protection against cognitive biases and limitations. Of particular interest is step 5, which requires the analyst to draw tentative conclusions about the likelihood of each hypothesis. It has been argued that ACH recommends analysts consider the likelihood of each hypothesis h given the assertion of each item of evidence, e, i.e. $p(h|e)$. However, this can reasonably be interpreted to mean that the negation of each item of evidence, not e should also be considered ($p(h|\text{not } e)$). Consideration of counterfactuals has the advantage that the model can be constructed independently of known facts and continually evaluated if the value of the evidence changes over time.

The difference in interpretation lies in whether the evidence with respect to the hypotheses is considered a priori or a posteori. Evidence can be constructed a posteori by the analyst from the 'facts at hand', where the evidence has already been measured and valued, rather than from a general examination of the possible signs for each hypothesis. While examination of available data is usually relevant, 'hidden facts', i.e. conditions which are not observable, or conditions which have not yet taken place, are also likely to be relevant to the analysis. If reasoning is conducted a priori, then the value of the evidence is uncertain, and the analyst is more likely to consider the consequences of it being false as well as the consequences of it being true. If the reasoning is a posteori, the analyst may know whether the evidence is true or false, and not consider its counterfactual to be relevant in determining the likelihood of the hypothesis. This is a mistake, since the analysis model will no longer be relevant if the value of the evidence changes, or there is uncertainty about its value.

Richard Heuer points out that analysts should interpret 'evidence' in its broadest sense and not limit oneself just to current intelligence reporting. Indeed ACH is able to model the absence of evidence as well as its presence, and when done diligently presents no conceptual problem. However, ACH does not require analysts to consider both the assertion and negation of evidence, and this deficiency may lead them to frame the problem in terms of a single view of evidence, which often leads to incorrect conclusions, especially if deception or denial is being undertaken by an adversary.

Analysis of Competing Hypotheses—Counter Deception (ACH-CD)

ACH-CD was developed by Frank Stech and Christopher Elässer of the MITRE Corporation as a modified variant of ACH to account for cognitive factors that make people poor at detecting deception: Stech & Elässer op cit. The authors correctly argue that the use of ACH can lead to greater susceptibility for deception, especially when reasoning about a single view of evidence, i.e. the likelihood of each hypothesis given the assertion of the evidence $p(h|e)$. Their argument is that this type of reasoning neglects the base rates both of the evidence $br(e)$ and of the hypothesis $br(h)$ which can result in reasoning errors that lead to incorrect conclusions, see K. Burns, *Mental Models and Normal Errors*. Lawrence Erlbaum Associates, 2004, ch. How Professionals Make Decisions. [Online] Available: http://mentalmodels.mitre.org/Contents/NDM5_Chapter.pdf. More correctly it should be said that reasoning using only one of the logical conditionals (usually the positive conditional, $p(h|e)$) is more likely to produce reasoning flaws than when both are considered. Stech and Elässer make the same point when they argue that analysts' judgements are more susceptible to deception if they also do not take the false positive rate of the evidence into account. An example of this susceptibility to deception is provided by Stech and Elässer is how the reasoning about the detection of Krypton gas in a middle-eastern country can lead to the erroneous conclusion that the country in question likely has a nuclear enrichment program. For clarity, their example has been reproduced below:

Detect Krypton $p(\text{enrichment}|\text{Krypton})=\text{high}$ $\rightarrow p(\text{enrichment program})=\text{high}$ $\rightarrow p(\text{nuclear program})=\text{high}$ They argue that the main problem with this reasoning is that it does not consider that Krypton gas is also used to test pipelines for leaks, and that being a middle-eastern country with oil pipelines, the probability of the gas being used outside of a nuclear program is also fairly high, i.e. $p(\text{Krypton}|\text{not enrichment})=\text{medium to high}$. This additional information should lead the analyst to the conclusion that there is a fair amount of uncertainty of a nuclear program given the detection of Krypton. The assignment of the 'high' value to $p(\text{enrichment}|\text{Krypton})$ neglects the fact that an oil-rich middle-eastern country is likely to use Krypton gas, regardless of whether they have a nuclear program.

However, it can be argued that Stech and Elässer have interpreted Step 5 of ACH more narrowly than perhaps was intended. Heuer makes no claim about which of $p(h|e)$ or p(e|h), and their corresponding counterfactuals p(h| not e), p(e| not h), should be used. Heuer describes the process in such general terms as to be consistent with either interpretation, although consideration of counterfactuals is essential if basic reasoning errors are to be avoided. In any event, it can be shown that p(h|e) and p(h|not e) can be derived from knowledge of p(e|h), p(e|not h) and the base rate of the hypothesis br(h). Therefore the choice of which logical conditionals to use is less important then the soundness of the belief values assigned to them. The choice of logical conditionals becomes more important when the analyst considers whether the evidence is causal in nature with respect to the hypotheses, or is merely derivative. The problem of framing with respect to the causal or derivative nature of evidence and the implications for reasoning is discussed further below.

SUMMARY OF THE INVENTION

Object of the Invention

An aim of the invention is to create better formal methods for analysis of competing hypotheses that can be used under a wider variety of circumstances and which can handle both empirical data and formally-expressed beliefs as evidence for or against each hypothesis.

A further aim of certain embodiments is to provide tools for the management of intelligence analysis that allow clear delineation of assumptions and chains of inference; the specification of the degree of uncertainty about the evidence and resultant conclusions; and the elaboration of alternative perspectives and conclusions.

Disclosure of the Invention

The inventors have developed a formal approach to the evaluation of competing hypotheses that is based on the belief calculus known as Subjective Logic. The development of this more formal approach allows for integration of empirical and statistical data, as well as for judgements made by analysts.

Also, this formal approach makes redundant the separate analysis of diagnosticity of evidence. Under the formal approach of preferred embodiments of the invention, diagnosticity is formally derived from the model and need not be considered as a separate input to the model, except perhaps as means of limiting the initial set of evidence that should be formally considered, or for purposes of prioritizing evidence collection.

In one aspect, the invention provides a method of analysis of competing hypotheses, said method comprising the steps of:
 a. deciding on possible hypotheses to be considered;
 b. identifying significant items of evidence for and against each hypothesis;
 c. constructing a model for analysing the hypotheses by:
  i. producing a set of exhaustive and exclusive hypotheses, wherein only one hypothesis may be true;
  ii. assessing and assigning base rates for each hypothesis;
  iii. determining a set of items of evidence that are relevant to, have a causal influence on, are diagnostic or symptomatic of, or may disconfirm one or more hypotheses;
  iv. assessing and assigning base rates for each item of evidence;
  v. deciding for each item of evidence whether the item should be treated as being a causal influence or diagnostic indicator with respect to the set of the hypotheses;
  vi. if the item of evidence is to be treated as a causal influence—making a judgement as to the likelihood of each hypothesis:
   A. if the evidence were true, and
   B. if the evidence were false;
  vii. if the item of evidence is to be treated as a diagnostic indicator—making a judgement as to the evidence being true:
   A. if the hypothesis were true;
 d. assessing the belief for each item of evidence being true;
 e. deciding a set of interim beliefs in each hypothesis for each individual item of evidence by:
  i. employing a conditional inference operator for evidence that is to be treated as a causal influence; and
  ii. employing a reverse conditional inference operator for evidence that is to be treated as a diagnostic indicator; and
 f. deciding the overall belief in each hypothesis by employing a consensus operator on the respective set of interim beliefs.

Preferably the step of identifying the set of significant items of evidence is not limited to what evidence is already known or believed to be discoverable.

Suitably the steps of assigning base rates to hypotheses and to the items of evidence involves assigning prior probabilities to each hypothesis and to each item of evidence, respectively.

The competing hypotheses in the set are preferably alternative explanations of the evidence; for example alternative courses of action for decision making, alternative system or medical diagnoses, alternative classifications or characterisations of a situation, entity or event; alternative outcomes for games and races.

The evidence desirably includes possible causal influences and diagnostic indicators for one or more of the hypotheses.

The belief for an item of evidence or hypothesis being true suitably includes both the certainty and likelihood of the item of evidence being true. Furthermore the likelihood of the belief an item of evidence or hypothesis being true suitably expresses the probability of the item of evidence being true.

Preferably the certainty of the belief an item of evidence or hypothesis being true expresses the strength of the claim about the assigned likelihood being accurate.

Most desirably the step of deciding the belief in each interim hypothesis for each item of evidence should be considered apart from the general set of evidence under consideration in relation to the hypothesis.

The model may be comprised of a set of conditionals for all items of evidence and the hypotheses, wherein said model can be used to evaluate a complete or incomplete set of evidence by inputting a set of observable evidence together with expressions of vacuous beliefs where no data is available, whereby the model outputs a set of beliefs representing the certainty and likelihood of each hypothesis.

In another broad aspect, the invention provides a method of analysing a set of exhaustive and exclusive hypotheses, said method comprising the steps of.

assessing and assigning base rates for each hypothesis;
 determining a set of items of evidence that are relevant to, have a causal influence on, are diagnostic or symptomatic of, or may disconfirm one or more hypotheses;
 assessing and assigning base rates for each item of evidence;
 deciding, for each item of evidence, whether the item should be treated as being a causal influence or diagnostic indicator with respect to the set of the hypotheses;

if the item of evidence is to be treated as a causal influence—making a judgement as to the likelihood of each hypothesis, both if the evidence were true, and also if the evidence were false;

if the item of evidence is to be treated as a diagnostic indicator—making a judgement as to the evidence being true if the hypothesis were true;

assessing the belief for each item of evidence being true;

deciding a set of interim beliefs in each hypothesis for each individual item of evidence by:

employing a conditional inference operator for evidence that is to be treated as a causal influence; and employing a reverse conditional inference operator for evidence that is to be treated as a diagnostic indicator; and deciding the overall belief in each hypothesis by employing a consensus operator on the respective set of interim beliefs.

In another aspect of the invention, there is provided a computer readable medium having stored thereon one or more sequences of instructions for causing one or more processors to execute the steps of the methods recited in the foregoing statements.

In a still further aspect, the invention provides a system for analysing a set of exhaustive and exclusive hypotheses, said system comprising at least one processor for executing instructions, memory means coupled to the processor, storage means for reading media having sequences of instructions stored thereon coupled to the storage means, input/output means for delivering data to and/or from the memory or storage means and user interface means allowing for interaction with said instruction sequence, which sequence also causes said at least one processor to execute the steps of:

assessing and assigning base rates for each hypothesis;

determining a set of items of evidence that are relevant to, have a causal influence on or would disconfirm more than one hypothesis;

assessing and assigning base rates for each item of evidence;

deciding, for each item of evidence, whether the item should be treated as being a causal influence or diagnostic indicator with respect to the set of the hypotheses;

if the item of evidence is to be treated as a causal influence—making a judgement as to the likelihood of each hypothesis, both if the evidence were true, and also if the evidence were false;

if the item of evidence is to be treated as a diagnostic indicator—making a judgement as to the evidence being true if the hypothesis were true;

assessing the belief for each item of evidence being true;

deciding a set of interim beliefs in each hypothesis for each individual item of evidence by:

employing a conditional inference operator for evidence that is to be treated as a causal influence; and employing a reverse conditional inference operator for evidence that is to be treated as a diagnostic indicator; and deciding the overall belief in each hypothesis by employing a consensus operator on the respective set of interim beliefs.

BRIEF DETAILS OF THE DRAWINGS

In order that this invention may be more readily understood and put into practical effect, reference will now be made to the accompanying drawings illustrate preferred embodiments of the invention, and wherein:

FIG. 10A is a table showing a model defined using a mixture of causal and derivative conditionals;

FIG. 10B is a table showing the model of FIG. 10A after transformation into a normalised form;

DESCRIPTION OF EMBODIMENTS OF THE INVENTION

Figure 1:
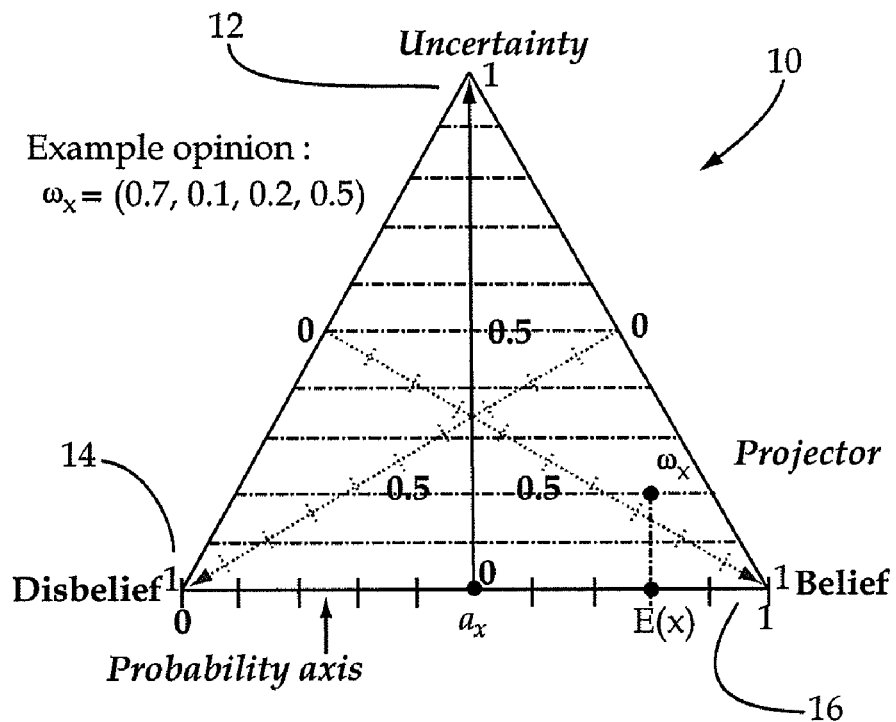
FIG. 1 is a diagram of an opinion triangle with an example opinion associated with a first embodiment of the invention.

An embodiment of the present invention, which provides a framework for the analysis of multiple hypotheses with a plurality of items of evidence, will be described with reference to several of examples. In particular the method of the embodiment, termed Analysis of Competing Hypotheses using Subjective Logic (ACH-SL), was developed to address some of the key analytical issues within the defense, intelligence, and law enforcement communities. However, it will be appreciated that the method of the invention will find application in many spheres of government and business which involve complex decision making. This section will first outline the ACH-SL process of the embodiment and discuss some of its desirable features, including:

compatibility with 'fuzzy' human representations of belief;

interoperability with Bayesian systems;

formalized abductive and deductive reasoning support; and, a priori derivation of diagnosticity from analyst judgements.

The outline of the analysis method of the embodiment or ACH-SL includes a number of steps, which may be conveniently summarised as follows:

1) Identify the possible hypotheses to be considered;

2) Make a list of significant evidence and arguments for and against each hypothesis.

3) Prepare a model consisting of:

a) A set of exhaustive and exclusive hypotheses—where one and only one must be true.

b) A set of items of evidence that are relevant to one or more hypotheses; are influences that have a causal influence on one or more hypotheses; or, are diagnostic or symptomatic of; or may disconfirm one or more hypotheses.

4) Consider the evidence with respect to the hypotheses:
   a) For each hypothesis and item of evidence, assess its base rate.
   b) Should the evidence be treated as causal or derivative? Decide and record for each item of evidence or evidence/hypothesis pair.
   c) Make judgements for causal evidence as to the likelihood of each hypothesis if the evidence were true and if the evidence were false.
   d) Make judgements for derivative evidence as to the likelihood that the evidence will be true if the hypothesis were true, and if the hypothesis were false.
   e) From the above judgements, compute the diagnosticity for each item of evidence.
5) Measure the evidence itself and decide the belief (certainty and likelihood) that the evidence is true. Supply the measured evidence as input into the constructed model, and use the Subjective Logic calculus to compute the overall likelihood of each hypothesis.
6) Analyze how sensitive the conclusion is to a few critical items of evidence. Changes in the value of evidence with high diagnosticity will alter the calculated likelihoods more than evidence with low diagnosticity. Consider the consequences for your analysis if that evidence were wrong, misleading, or subject to a different interpretation.
7) Record and report conclusions. Discuss the relative likelihood of all the hypotheses, not just the most likely one.
8) Identify milestones for future observation that may indicate events are taking a different course than expected.

Each of the above steps of the method of analysis of competing hypotheses of the embodiment will be discussed in turn.

Determining Base Rates of Evidence and Hypotheses

One of the main problems of applying probability theory and belief calculi to real world problems is determining the base rates for evidence and hypotheses. A distinction can be made between events that can be repeated many times and events that can only happen once. Events that can be repeated many times are "frequentist" events and the base rates or prior probabilities for these can be derived from first principles, or reasonably approximated through empirical observation. For example, if an observer knows the exact proportions of the different colored balls in an urn, then the base rates will be equal to the probabilities of drawing each of the colors. For frequentist problems where base rates cannot be known with absolute certainty, then approximation through prior empirical observation is possible. For events that can only happen once, the observer must arbitrarily decide what the base rates should be, and are often omitted as a consequence.

The difference between the concepts of subjective and frequentist probabilities is that the former can be defined as subjective betting odds, and the latter as the relative frequency of empirically observed data, where the two collapse in the case where empirical data is available. The concepts of subjective and empirical base rates can be defined in a similar manner where they also converge and merge into a single base rate when empirical data is available. As an example, consider how a public health department establishes the base rate of some disease within a community. Typically, data is collected from hospitals, clinics and other sources where people diagnosed with the disease are treated. The amount of data that is required to calculate the base rate of the disease will be determined by some departmental guidelines, statistical analysis, and expert opinion about the data that it is truly reflective of the actual number of infections, which is itself a subjective assessment. After the guidelines, analysis and opinion are all satisfied, the base rate will be determined from the data, and can then be used in medical tests to provide a better indication of the likelihood of specific patients having contracted the disease.

1) Base Rates of Hypotheses

As a consequence of the ways in which base rates can be formed, there is an inherent danger in assigning base rates to hypotheses when dealing with events that can only happen once, or when a hypothesis does not have a strong relationship with a well-established model for the approximation of its base rate. Typically, events that have humans as causal influences are poor candidates for empirical base rates since they are highly contextual and may be subject to slight variation which cause large perturbations in their appearance. In addition, much of strategic intelligence deals with hypotheses that can only happen once and for which empirical data that can be used to approximate base rates simply does not exist.

In these cases, the base rates for non-repeatable hypotheses should be evenly weighted since they form a exhaustive and exclusive state space, one and only one of the hypotheses is true. So, for a set of k hypotheses $\Phi=\{h_1, h_2, \ldots h_k\}$, the base rate of each hypothesis should be 1/k, i.e.:

$$\forall\, h_i \in \Phi,\; br(h_i) = \frac{1}{k} \tag{1}$$

For three hypotheses, the base rate of each hypothesis should be ⅓; for four hypotheses, the base rate should be ¼, and so on. This follows from the Principle of Indifference which states that if we are ignorant of the ways an event can occur, the event will occur equally likely in any way.

Setting the base rates to other than equal values for non-repeatable events is strongly discouraged. Doing so introduces an inherent bias in the model and may produce erroneous conclusions. Any direct reasoning about base rates under these conditions should be discarded in favor of consideration of the evidence. If reasoning is applied to subjectively determine base rates, that reasoning should be explicitly stated in the model instead of implicitly included in the hypotheses' base rates. The evidence for the reasoning should be included as a standard part of the model and treated like all other evidence. Doing so reduces the likelihood of erroneous conclusions and eliminates the possibility of 'double counting' evidence, where the evidence has already been taken into account in setting the base rate but is also used as part of the model to reason about the hypotheses.

2) Base Rates of Evidence

Base rates for evidence should be considered in the same way as for hypotheses. The set of hypotheses form an exhaustive and exclusive state space, such that one and only one hypothesis is true. Similarly for each item of evidence, consideration must be given to the other elements of the state space in which the evidence is situated. When the base rate for a item of evidence can not be derived from first principles or approximated through empirical testing, then the base rate should be set according to proportion of the state space that the evidence consumes.

For example, the blood type being found at a crime scene to be AB might be considered evidence for or against certain competing hypotheses. The complete state space in which the evidence "Blood sample is type AB" allows for three other possibilities, namely that the blood type is A, B, or O. If the prevalence of the four different blood types within the community was known as a result of analysis of statistical data, then the empirically approximated base rates should be used.

If they are not known or cannot be reliably derived, then the base rate for a result of blood type AB should be set at ¼. Typically, most evidence will have a base rate of ½ when dealing with simple true/false statements. However, consideration of the complete state space in which the evidence is situated is important so as not to introduce base rate errors into the model.

Causal and Derivative Evidence

Abduction reasons about the likelihood of the hypothesis, given the likelihood of the assertion of the evidence under conditions when the hypothesis is true and false, i.e. using p(e|h); p(e|not h). Physicians primarily use abduction for medical diagnosis when considering the likelihood of a patient having a particular disease, given that the patient presents specific symptoms that are associated with the disease.

By contrast, deduction directly reasons about the likelihood of the hypothesis, given the likelihoods of the hypothesis under conditions of the assertion and negation of the evidence, i.e. using p(h|e); p(h| not e). Deduction is most often applied when there can be a causal link from the evidence to one or more hypotheses, such as when reasoning about the likelihood of a patient having a particular disease, given the possibility of recent exposure to the same infectious disease.

The existing ACH involves a process that uses deductive reasoning, while Stech and Elässer explicitly use an abductive approach to reasoning with ACH-CD, as discussed in the background. Both deductive and abductive reasoning have their uses and limitations. Deductive reasoning is best suited for reasoning about causal evidence, while abductive reasoning is best suited for reasoning about derivative evidence.

Causal evidence has a direct causal influence on a hypothesis, such as the presence of a persistent low pressure system is causal evidence for rain, since a low pressure system has a direct influence on precipitation. The 'state of mind' of an adversary is often regarded as causal evidence since it usually has a direct influence on their decision making processes. Derivative evidence, also known as diagnostic evidence, is indirect secondary evidence—not causal in nature—and is usually observed in conjunction, or is closely associated with the hypothesis. For example, a soggy lawn should be considered derivative evidence for rain, but soggy lawns are also associated with the use of sprinklers, and recently-washed automobiles. In the nuclear enrichment example from Stech and Elässer above, the detection of Krypton gas would be considered derivative evidence, since the presence of Krypton gas does not causally influence the likelihood of a nuclear enrichment program.

In theory, both deductive and abductive reasoning can be used for analysis of competing hypotheses, providing the logical conditionals have suitable belief assignments. In practice though, there is an inherent danger in applying deductive reasoning to derivative evidence, just as there is a danger in applying abductive reasoning to causal evidence. The problem lies in how the questions about the evidence and the hypothesis are framed, and the nature of causality that can be inferred.

1) Reasoning About Causal Evidence

Using abductive reasoning to reason about causal evidence requires more cognitive effort than using deductive reasoning. It requires the analyst to suppose the assertion or negation of the consequent and reason about the likelihood of the antecedent, p(e|h) and p(e|not h). At best, it is likely that the analyst is actually reasoning about the likelihood of the consequent given the assertion and negation of the antecedent, p(h|e) and p(h|not e), and simply approximating p(e|h) and p(e|not h) as a result. At worst, the analyst can draw completely different inferences that violate the causal nature of the evidence and lead to incorrect reasoning about the hypotheses.

For example, during the Cuban missile crisis of 1962, President Kennedy publicly warned that the United States would view any Soviet strategic missile placements in Cuba as a grave threat and would take appropriate action. An abductive approach to this problem would require the analyst to ask of themselves:

p(e|h) If the Soviets are shipping strategic missiles to Cuba, what is the likelihood that the President made a public statement that the U.S. would perceive strategic missile placement as a threat?

p(e|not h) If the Soviets are not shipping strategic missiles to Cuba, what is the likelihood that the President made a public statement that the U.S. would perceive strategic missile placement as a threat?

The way the question is framed suggests that the analyst should consider how likely there will be a public statement given the existence of strategic missiles in Cuba. If the analyst was unaware of the likely intention of the public statement, they might reasonably conclude that it is more likely that the a public statement would be made if the Soviets are in the process of shipping strategic missiles to Cuba, thus increasing the likelihood of the 'missiles' hypothesis. However, this is almost certainly not as President Kennedy intended, instead likely reasoning that a public statement would serve to dissuade the Soviet leadership from shipping strategic missiles to Cuba, or at worst have no appreciable effect. In other words, he reasoned that the public statement would act in a causal manner to increase the likelihood of the 'no missiles' hypothesis, see J. Zlotnick, *Bayes' theorem for intelligence analysis*, Studies in Intelligence, vol. 16, no. 2, Spring 1972. [Online] Available: http://www.odci.gov/csi/kent csi/pdflv16i2a03d.pdf.

If we apply a deductive approach to the same question, the analyst is required to ask of themselves different questions that preserve the causal nature of the evidence and appear less likely to facilitate the same framing errors:

p(h|e) If the President made a public statement that the U.S. would perceive strategic missile placement as a threat, what is the likelihood that the Soviets are shipping strategic missiles to Cuba?

p(h|not e) If the President did not make a public statement that the U.S. would perceive strategic missile placement as a threat, what is the likelihood that the Soviets are shipping strategic missiles to Cuba?

Here the framing of the question suggests that the statement will influence the outcome, and one would probably conclude that the statement will serve to lessen the likelihood of missiles being shipped to Cuba, all other things being equal. This effect is similar to the paradoxical probability assessments problem of logically-equivalent pairs of conditional propositions, discussed by A. Tversky and D. Kahneman in *Judgment under Uncertainty: Heuristics and Biases*. Press syndicate of the University of Cambridge, 1982, ch. Causal schemas in judgments under uncertainty, pp. 117-128.

2) Reasoning About Derivative Evidence

The same paradox holds true for deductive reasoning about derivative evidence. Deductive reasoning requires the analyst to ask questions in a way that implies that the evidence is causal in nature. Deductive reasoning about derivative evidence also requires more cognitive effort than abductive reasoning, and can also lead to incorrect conclusions. For example, consider the questions that an analyst might ask themselves if deductive reasoning were applied to the nuclear enrichment hypothesis.

p(h|e) If Krypton gas is detected in Iraq, what is the likelihood that the Iraqis have a nuclear enrichment program?

p(h|not e) If Krypton gas is not detected in Iraq, what is the likelihood that the Iraqis have a nuclear enrichment program?

The framing of the question does not prompt the analyst to consider the likelihood of Krypton gas when there is no nuclear enrichment program, i.e. p(e|not h). If the analyst is unaware that Krypton gas is also used for detecting leaks in oil pipelines, they will likely erroneously conclude that the likelihood of p(h|e) is high. The analyst might reasonably infer from the framing of these questions that p(e|h) may be a good approximation for p(h|e) since Krypton gas is a by-product of nuclear enrichment, which may cause them to miss the fact that Krypton gas is merely diagnostic, and incorrectly conclude that its presence implies a nuclear enrichment program. When the problem is framed using abductive reasoning, the analyst is prompted to consider the likelihood of Krypton gas in cases where there would be no nuclear enrichment program and the framing problems disappear.

p(e|h) If the Iraqis have a nuclear enrichment program, what is the likelihood that Krypton gas will be detected?

p(e|not h) If the Iraqis do not have a nuclear enrichment program, what is the likelihood that Krypton gas will be detected?

Even though humans routinely attribute causality where none exists (see Tversky and Kahneman above), framing the question to preserve the derivative nature of the evidence makes it less likely that the analyst will misattribute causality.

Similar conclusions may be reached as for the use of abduction for causal evidence. While it is possible to use either style of reasoning for both types of evidence, less cognitive effort is required when deductive reasoning is used for causal evidence and abductive reasoning is used for derivative evidence, and therefore erroneous reasoning due to framing is less likely to occur.

Constructing the Analytical Model

We now turn to the background required in relation to the construction of a model for analysing the evidence and related hypotheses. Logical conditionals are a pair of conditional beliefs that is used for reasoning about the likelihood of a hypothesis, given some evidence. The values of these conditionals constitute the judgements that the analyst supplies as part of the ACH-SL process to reason about each hypothesis in respect of each item of evidence. Assigning belief values to the conditionals requires that the analyst answer certain questions of themselves, and probably others, including experts. The style of reasoning that is used for the evidence and hypothesis will largely determine the type of questions to be answered, which in turn will be strongly influenced by the causal or derivative nature of the evidence with respect to the hypothesis. For deductive reasoning, the questions should use the following or an equivalent form:

p(h|e) If [the evidence is true], what is the likelihood that [the hypothesis is true]?

p(h|not e) If [the evidence is false], what is the likelihood that [the hypothesis is true]?

By contrast, abducive reasoning should use questions in the following or an equivalent form:

p(e|h) If [the hypothesis is true], what is the likelihood that [the evidence is true]?

p(e|not h) If [the hypothesis is false], what is the likelihood that [the evidence is true]?

For each question, the analyst must assign a value while considering only the evidence and the hypothesis to which it relates. They must assume when providing a judgement that no other information is known about other hypotheses or other items of evidence, other than the base assumptions on which the model is predicated. This is done for two reasons. Firstly, as a human being, the analyst will be incapable of weighing more than four factors simultaneously in supplying a judgement, even though that they may believe that they are considering dozens. Secondly, the analyst runs the risk of introducing bias if each judgement is not considered in isolation, which will also bias the overall conclusions about the likelihoods of the hypotheses and make it difficult for others, including policy makers, to understand the reasoning employed by the analyst.

1) Constraints on Logical Conditionals

The two types of logical conditionals used in inductive reasoning have different mathematical requirements placed on their values as a result. The logical conditionals used for deduction are termed deductive logical conditionals, i.e. $p(h_i|e)$ and $p(h_i|\text{not } e)$. These conditionals must obey certain constraints in order to satisfy basic requirements of probability theory. For an exhaustive and exclusive set of hypotheses where one and only one hypothesis can be true, it logically follows that the sum of the probability expectations of the positive conditionals must be one; and similarly the probability expectations of the negative conditionals must also sum to one, since:

$$p(h_1|e)+p(h_2|e)+\ldots p(h_n|e)=1$$

$$p(h_1|\text{not } e)+p(h_2|\text{not } e)+\ldots p(h_n|\text{not } e)=1 \quad (2)$$

The logical conditionals used for abduction are termed abductive logical conditionals, i.e. $p(e|h_i)$ and $p(e|\text{not } h_i)$. These have different constraints to deductive logical conditionals and there is no requirement that the probability expectations of their positive conditionals sum to one since the items of evidence are in separate state spaces. The probability expectation of the positive conditional $p(e|h_i)$ is unconstrained for each hypothesis. However, the probability expectation of each negative conditional $p(e|\text{not } h_i)$ must be equal to the average of the probability expectations of the other positive conditionals of the other hypotheses, i.e.

$$p(e|\text{not } h_1)=(p(e|h_2)+p(e|h_3)+\ldots p(e|h_n))/(n-1) \quad (3)$$

Details on the constraints of logical conditionals are described further in the attached Appendix.

2) Model Coherence

Across multiple items of evidence, there are further constraints to ensure that the model is coherent. The requirements for coherence concern the assignment of belief values for different items of evidence for the same hypothesis. The constraints apply only to deductive logical conditionals $p(h_i|e_j)$ and $p(h_i|\text{not } e_j)$ which are either explicitly provided by the analyst when deductive reasoning is used, or are implicitly derived from knowledge of the abductive logical conditionals and base rate of the hypothesis.

The belief values assigned to the deductive logical conditionals of different items of evidence for the same hypothesis must have overlapping or adjoining ranges for the model to be coherent. If the ranges of belief assigned to the logical conditionals do not overlap or join, then at least one of the logical conditionals of an item of evidence must be incorrect. Put simply, model coherence requires that the minimum likelihood of the hypothesis for one item of evidence can not be greater than the maximum likelihood for another item of evidence, since both judgements were supplied independently. If the minimum for one item of evidence were to be greater than the maximum for another item of evidence, then this indicates that at least one of the judgements is incorrect since it is a logical and a physical impossibility for non-quantum events. Model coherence is also described further in the attached Appendix.

Subjective Logic

This section introduces Subjective Logic, which is extensively used within the ACH-SL approach to model the influence of evidence on hypotheses, and provide a calculus for the evaluation of the model when measurement of the evidence is provided.

Belief theory is a framework related to probability theory, but where the sum of probabilities over all possible outcomes not necessarily add up to 1, and the remaining probability is assigned to the union of possible outcomes. Belief calculus is suitable for approximate reasoning in situations where there is more or less uncertainty about whether a given proposition is true or false, and is ideally suited for both human and machine representations of belief.

Subjective logic[11] represents a specific belief calculus that uses a belief metric called opinion to express beliefs. An opinion denoted by $\omega_x^A = (b_x^A, d_x^A, u_x^A, a_x^A)$ expresses the relying party A's belief in the truth of statement x. Here e, d, and u represent belief, disbelief and uncertainty, and relative atomicity respectively where $b_x^A, d_x^A, u_x^A, a_x^A \in [0, 1]$ and the following equation holds:

$$b_x^A + d_x^A + u_x^A = 1. \quad (V.4)$$

The parameter $a_x^A$ represents the base rate of x and reflects the size of the state space from which the statement x is taken[5]. In most cases the state space is binary, in which case $a_x^A = 0.5$. The relative atomicity is used for computing an opinion's probability expectation value expressed by:

$$E(\omega_x^A) = b_x^A + a_x^A u_x^A, \quad (V.5)$$

meaning that a determines how uncertainty shall contribute to $E(\omega_x^A)$. When the statement x for example says "Party B is honest and reliable" then the opinion can be interpreted as trust in B, which can also be denoted as $\omega_B^A$.

The opinion space can be mapped into the interior of an equal-sided triangle, where, for an opinion $\omega_x = (b_x, d_x, u_x, a_x)$, the three parameters $b_x, d_x$ and $u_x$ determine the position of the point in the triangle representing the opinion. FIG. 1 illustrates an example where the opinion about a proposition x from a binary frame of discernment has the value $\omega_x = (0.7, 0.1, 0.2, 0.5)$.

The top vertex 12 of the triangle 10 represents uncertainty, the bottom left vertex 14 represents disbelief, and the bottom right vertex 16 represents belief. The parameter $b_x$ is the value of a linear function on the triangle which takes value 0 on the edge which joins the uncertainty and disbelief vertices and takes value 1 at the belief vertex. In other words, $b_x$ is equal to the quotient when the perpendicular distance between the opinion point and the edge joining the uncertainty and disbelief vertices is divided by the perpendicular distance between the belief vertex and the same edge. The parameters $d_x$ and $u_x$ are determined similarly. The edge joining the disbelief and belief vertices is called the probability axis. The relative atomicity is indicated by a point on the probability axis, and the projector starting from the opinion point is parallel to the line that joins the uncertainty vertex and the relative atomicity point on the probability axis. The point at which the projector meets the probability axis determines the expectation value of the opinion, i.e. it coincides with the point corresponding to expectation value $b_x + a_x u_x$.

Opinions can be ordered according to probability expectation value, but additional criteria are needed in case of equal probability expectation values. The embodiment uses the following rules to determine the order of opinions:

Let $\omega_x$ and $\omega_y$ be two opinions. They can be ordered according to the following rules by priority:
1) The opinion with the greatest probability expectation is the greatest opinion.
2) The opinion with the least uncertainty is the greatest opinion Opinions can be expressed as beta PDFs (probability density functions). The beta-family of distributions is a continuous family of distribution functions indexed by the two parameters $\alpha$ and $\beta$. The beta PDF denoted by beta $(\alpha, \beta)$ can be expressed using the gamma function $\Gamma$ as:

$$\text{beta}(\alpha, \beta) = \frac{\Gamma(\alpha + \beta)}{\Gamma(\alpha)\Gamma(\beta)} p^{\alpha-1}(1-p)^{\beta-1} \quad (V.6)$$

where $0 \leq p \leq 1$ and $\alpha, \beta > 0$, with the restriction that the probability variable $p \neq 0$ if $\alpha < 1$, and $p \neq 1$ if $\beta < 1$. The probability expectation value of the beta distribution is given by:

$$E(p) = \alpha/(\alpha+\beta). \quad (V.7)$$

The following mapping defines how opinions can be represented as beta PDFs.

$$(b_x, d_x, u_x, a_x) \mapsto \text{beta}\left(\frac{2b_x}{u_x} + 2a_x, \frac{2d_x}{u_x} + 2(1-a_x)\right). \quad (V.8)$$

This means for example that an opinion with $w_x = 1$ and $a_x = 0.5$ which maps to beta $(1, 1)$ is equivalent to a uniform PDF. It also means that a dogmatic opinion with $u_x = 0$ which maps to beta $(b_x \eta; d_x \eta)$ where $\eta \to \infty$ is equivalent to a spike PDF with infinitesimal width and infinite height. Dogmatic opinions can thus be interpreted as being based on an infinite amount of evidence.

Figure 2A:
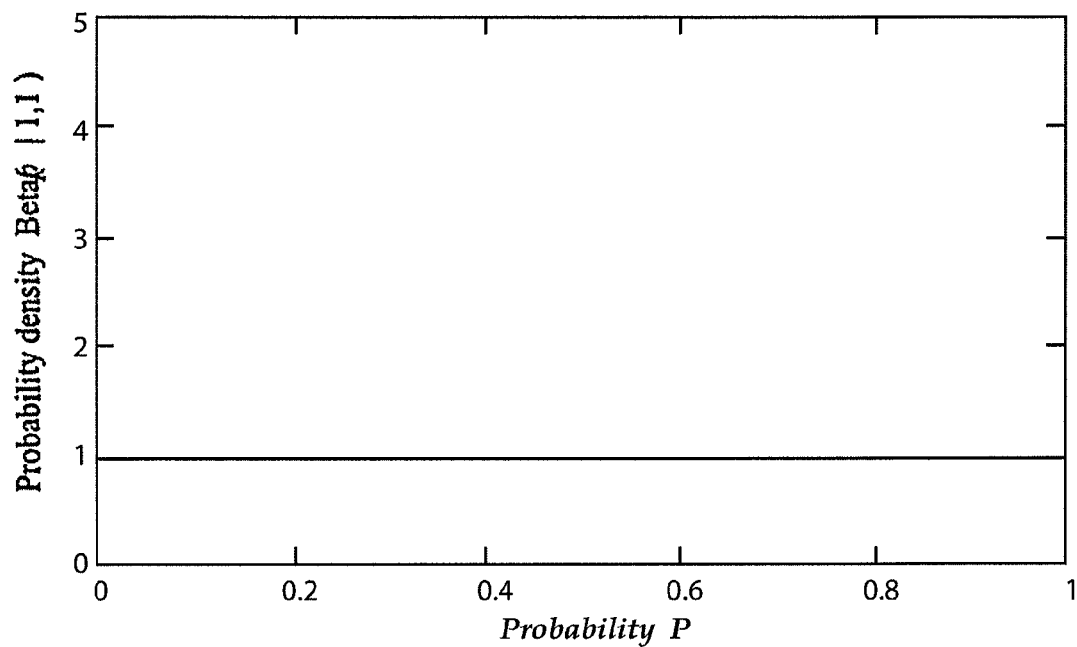
FIGS. 2A and 2B are graphs illustrating examples of probability distributions associated with the first embodiment.
Figure 2B:
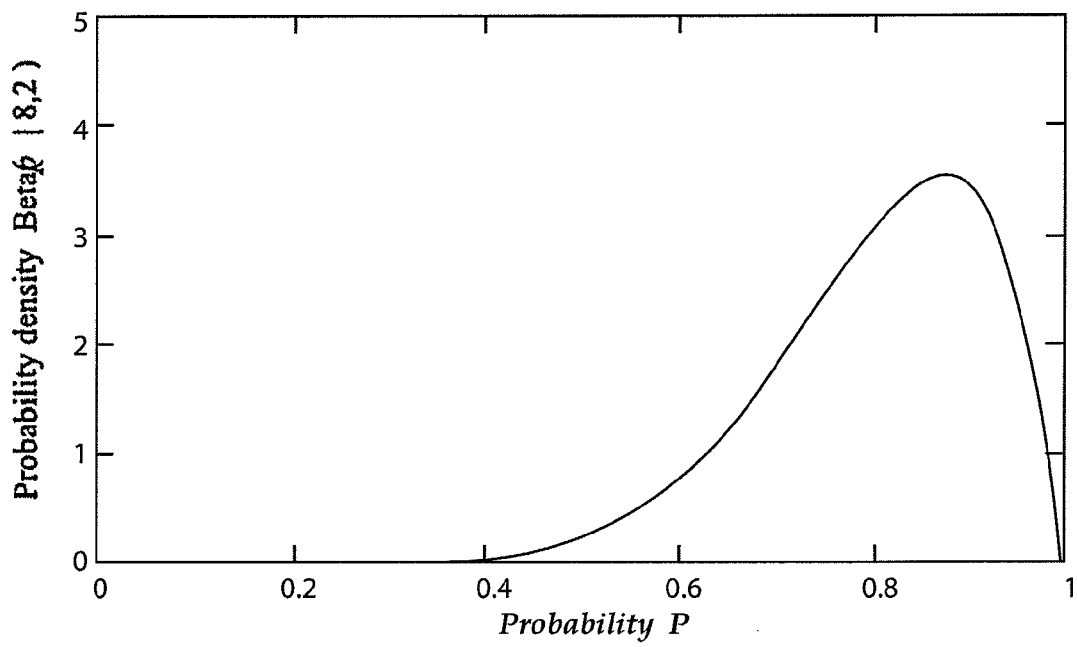

When nothing is known, the a priori distribution is the uniform beta with $\alpha = 1$ and $\beta = 1$ illustrated in FIG. 2A. Then after r positive and s negative observations the a posteriori distribution is the beta PDF with the parameters $\alpha = r+1$ and $\beta = s+1$. For example the beta PDF after observing seven (7) positive and one (1) negative outcomes is illustrated in FIG. 2B. This corresponds to the opinion of FIG. 1 through the mapping of Equation 8 (above).

A PDF of this type expresses the uncertain probability that a process will produce positive outcome during future observations. The probability expectation value of FIG. 2B is $E(p) = 0.8$. This can be interpreted as saying that the relative frequency of a positive outcome in the future is somewhat uncertain, and that the most likely value is 0.8. The variable p in Equation 6 is a probability variable, so that for a given p the probability density beta $(\alpha, \beta)$ represents second order probability. The first-order variable p represents the probability of an event, whereas the density beta$(\alpha, \beta)$ represents the probability that the first-order variable has a specific value. By definition, the PDF and the corresponding opinion always have the same probability expectation value, and can be interpreted as equivalent. This makes it possible to fuse opinions using Bayesian updating of beta PDFs.

Representations of Subjective Opinions

Opinions that are expressed in Subjective Logic can be transformed to and from other belief representations and can be visualized in a number of different ways. This section describes techniques for visualization; mapping between verbal fuzzy adjectives and Subjective Logic opinions; and transformation opinions to and from Bayesian representations of belief.

Subjective Logic opinions, Subjective Opinions, can be transformed without loss to and from Bayesian belief representations as discussed in the attached Appendix. This makes the Subjective Logic calculus ideal for reasoning about machine supplied data that correspond to, or can be interpreted as Bayesian representations of belief. The immediate implications of this are that systems that use Subjective Logic, such as the software application of the present embodiment are able to be interfaced with systems that use Bayesian representations of belief to provide data to other Bayesian systems, or take data from Bayesian systems to be used as input into an ACH-SL system.

In the earlier sections it is shown that bipolar beliefs in the form of opinions, as illustrated in FIG. 1, can be mapped to and interpreted as beta PDFs. While these two graphical representations give a concise mathematical visualization of bipolar beliefs, people unfamiliar with the underlying mathematical concepts can have difficulty interpreting them. For this reason, more intuitive graphical and verbal representations can be used. This is shown in FIG. 3, which is a screen capture of an online demonstration of the software implementation.

Figure 3:
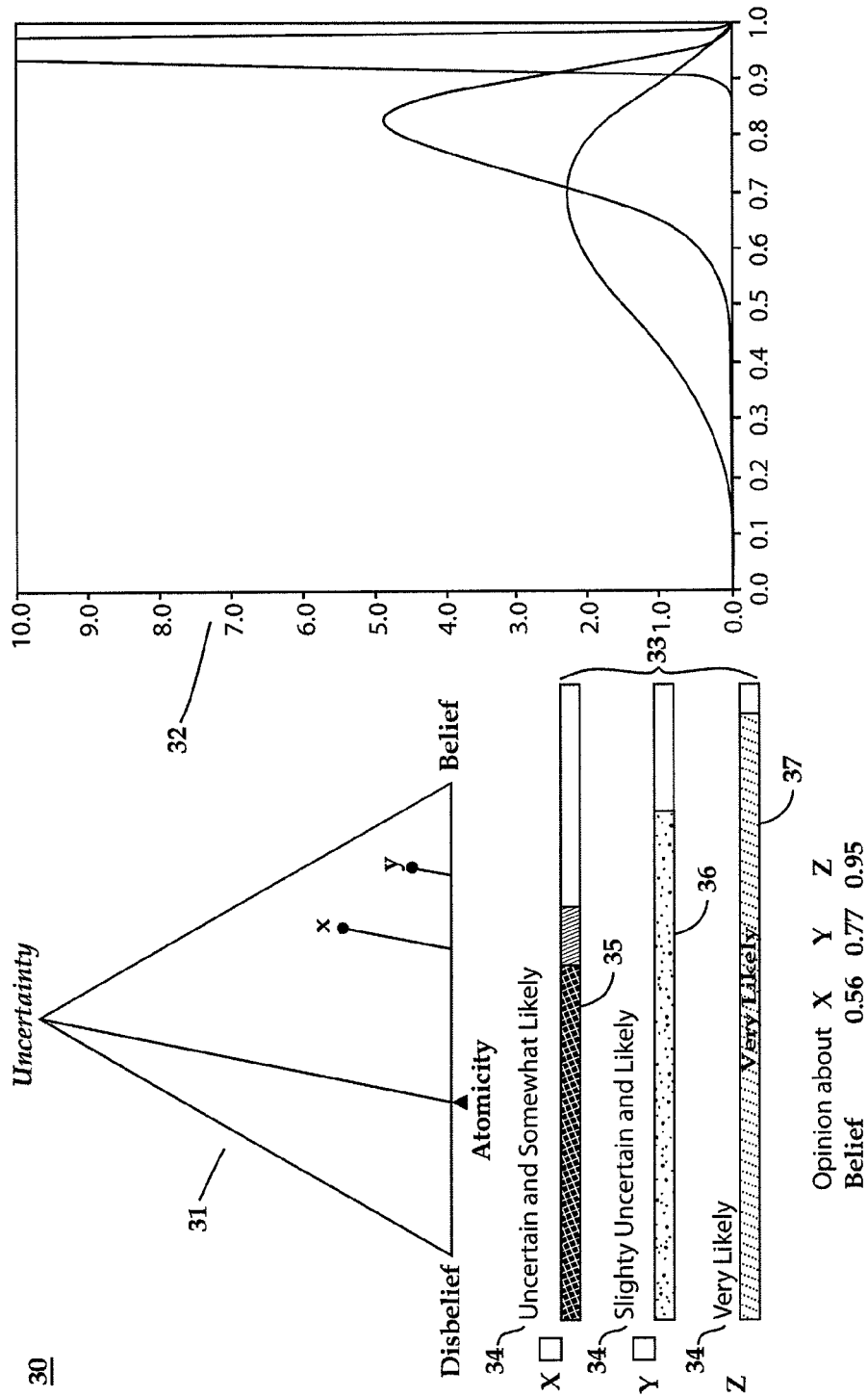
FIG. 3 is a compound graph for visualising a compound belief associated with the first embodiment.

The example diagram 30 depicted in FIG. 3 visualizes bipolar beliefs about three different statements x, y and z. Each belief is visualized in different ways, i.e. in the form of points in an opinion triangle 31, beta density functions 32, coloured/shaded bars 33, and fuzzy verbal categories 34. The interpretation of the opinion triangle and the beta PDF need no further explanation, as they have been described in the previous sections.

The horizontal shaded bars may be colored in the online demonstration, in order to ease interpretation. The first horizontal bar 35, representing the belief in x, consists of a dark shaded area represents $b_x$, and a light shaded area represents $a_x u_x$, i.e. the amount of uncertainty that contributes to $E(x)$, so that the total length of the dark and light shaded areas together represent $E(x)$. The second horizontal bar 36, representing the belief in y, consists of a green (leftmost) area representing $b_y$, an amber (middle) area representing $u_y$, and a red (rightmost) area representing $d_y$, as well as a black vertical line within the amber area indicating $E(y)$. This uses a 'traffic light' metaphor, where green indicates 'go', red indicates 'stop' and amber indicates 'caution'. The third horizontal bar 37, representing the belief in z, simply has a single dark shaded area representing $E(z)$.

Figure 4:
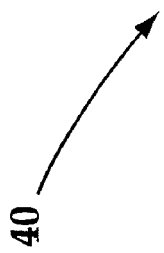
FIG. 4 is a table illustrating fuzzy categories associated with the first embodiment.

A fuzzy category is also indicated directly above each horizontal bar. The fuzzy verbal categories can be defined according to the need of the application. The example of FIG. 3 uses categories from the two-dimensional matrix 40 defined in FIG. 4. Note that the certainty category 'Certain' is implicit, and need not be mentioned together with the applicable likelihood category. These fuzzy verbal categories can be mapped to areas in the opinion triangle 31 in the manner illustrated in FIGS. 5A and 5B. The mapping must be defined for combinations of ranges of expectation, value and uncertainty. As a result, the mapping between a specific fuzzy category from FIG. 4 and specific geometric area in the opinion triangle depends on the base rate.

Without specifying the exact underlying ranges, the visualizations of FIG. 3 and FIGS. 5 indicate the ranges approximately. The edge ranges are deliberately made narrow in order to have categories for near dogmatic and vacuous beliefs, as well as beliefs that express expectation values near absolute 0 or 1. The number of likelihood categories, and certainty categories, as well as the exact ranges for each, must be determined according to the need of each application, and the fuzzy categories defined here must be seen as an example. Real-world categories would likely be similar to those found in *S. Kent, Sherman Kent and the Board of National Estimates: Collected Essays. CIA, Center for the Study of Intelligence*, 1994, ch. *Words of Estimated Probability*. [Online] Available:

http://www.cia.gov/csi/books/shermankent/6words.html; based on the Admiralty Scale as used within the UK National Intelligence Model8; or could be based on empirical results obtained from psychological experimentation.

Figure 5A:
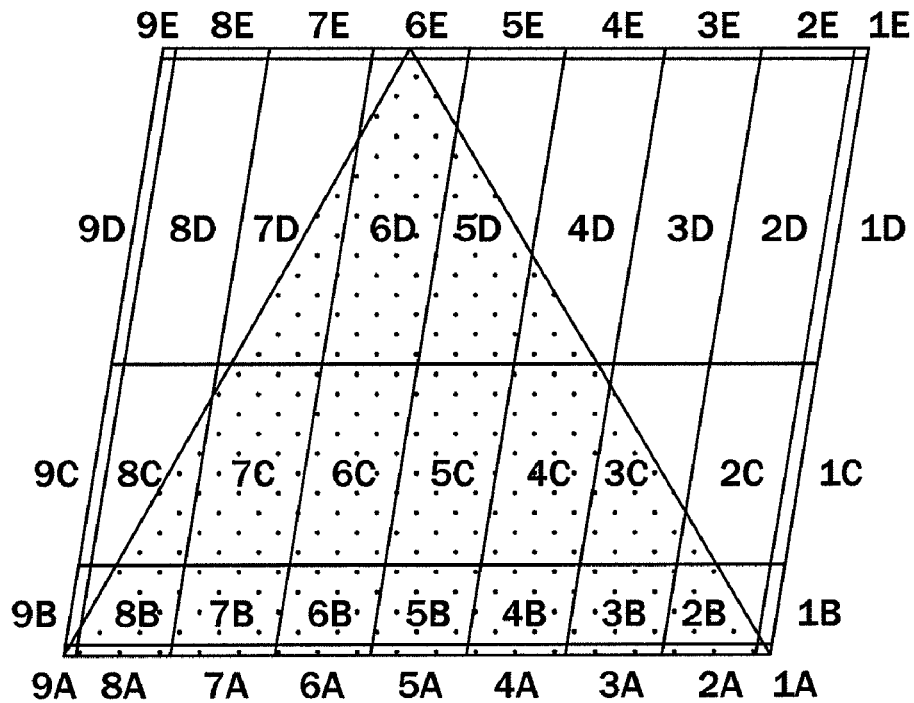
FIGS. 5A and 5B show mappings of fuzzy categories to ranges, associated with the first embodiment.
Figure 5B:
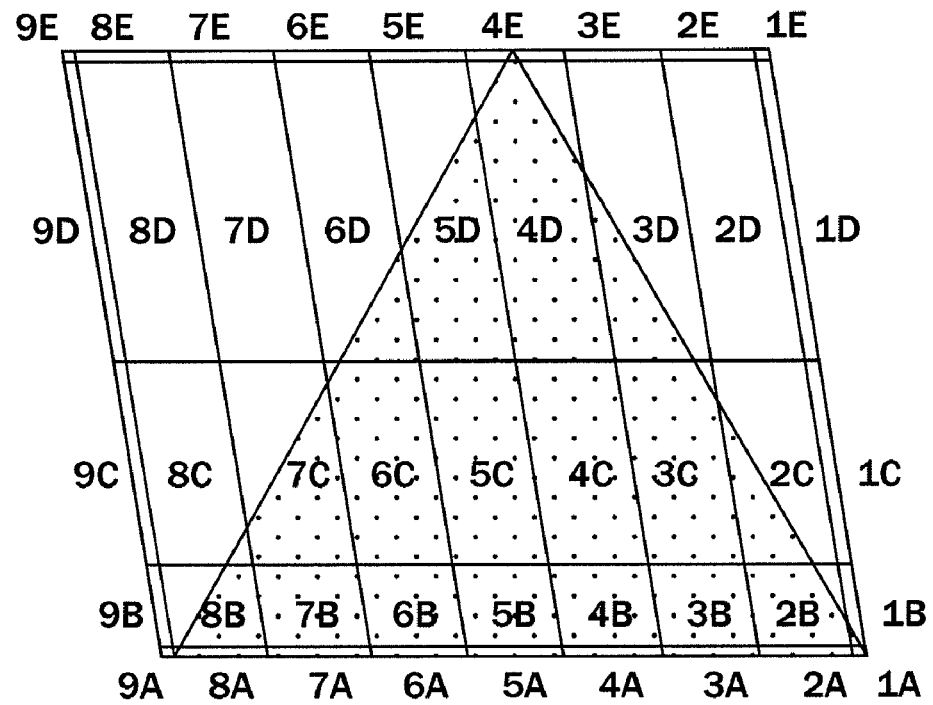

FIG. 5A illustrates the case with base rate $a=\frac{1}{3}$, which was also the case in the visualization in FIG. 3. Whenever a fuzzy category area overlaps, partly or completely, with the opinion triangle, that fuzzy category is possible. The possible mappings depend on the base rate. For example, it can be seen that the category 7D:

The possible mappings depend on the base rate. For example, it can be seen that the category 7D: "Unlikely and Very Uncertain" is possible in case $$a = \frac{1}{3},$$

but not in case $$a = \frac{2}{3}.$$

This is because the expectation of a state x is defined as $E(x)=b_x+a_x u_x$, so that when $a_x$, $u_x \rightarrow 1$, then $E(x) \rightarrow 1$, so that the likelihood category "Unlikely" would be impossible.

Mapping from fuzzy categories to Subjective Opinions is also straight-forward. Geometrically, the process involves mapping the fuzzy adjectives to the corresponding center of the portion of the grid cell contained within the opinion triangle (see FIGS. 5A and 5B). Naturally, some mappings will always be impossible for a given base rate, but these are logically inconsistent and should be excluded from selection.

It is interesting to notice that although a specific fuzzy category maps to different geometric areas in the opinion triangle depending on the base rate, it will always correspond to the same range of beta PDFs. It is simple to visualize ranges of bipolar beliefs with the opinion triangle, but it would not be easy to visualize ranges of beta PDFs. The mapping between bipolar beliefs and beta PDFs thereby provides a very powerful way of describing PDFs in terms of fuzzy categories, and vice versa.

Calculating Opinions About the Hypotheses

The likelihood of each hypothesis can be calculated from knowledge of the base rate for each hypothesis $br(h_i)$; the base rate for each item of evidence $br(e_j)$; the logical conditionals for each hypothesis/evidence pair $(h_i, e_j)$; and measurements/ opinions about the evidence $p(e_i)$. Two distinct steps are required:
1) The likelihood of each hypothesis, $h_i$, for each item of evidence, $e_i$ is inferred using either abduction or deduction, depending on whether abductive or deductive logical conditionals that are provided. This produces knowledge of $p(h_i)$ for each $e_j$, i.e. $p(h_i|e_j)$.
2) The overall likelihood for each item of evidence, $p(h_i)$ for each $h_i$, is computed by fusing the separate $p(h_i|e_j)$ opinions using the consensus operator.

This section discusses these three basic Subjective Logic operators that are used within the ACH-SL system for inferring the likelihoods of the hypotheses from what is known about the evidence.

Figure 6:
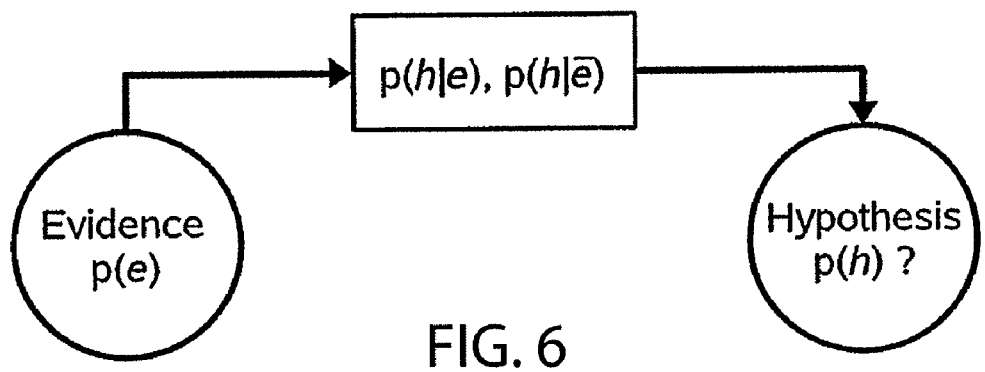
FIG. 6 is a diagram representing deductive reasoning from the evidence to the hypothesis.

1) Deduction: Deduction reasons about the likelihood of a hypothesis, given knowledge of the likelihood of the hypothesis being true when some evidence is observed; and the likelihood of the hypothesis being true when the evidence is not observed (see FIG. 6). Deductive reasoning is often used for reasoning when the appearance of the evidence temporally precedes the appearance of the hypothesis, where there is a causal link from the evidence to the hypothesis.

As an example, suppose that a physician working in an area with a high rate of disease as the result of some natural disaster is trying to determine the likelihood of a patient having contracted an infectious disease. The patient has no visible signs or reported symptoms, but the physician knows that direct contact with a carrier of the disease results in an infection 95 percent (0.95) of the time. However, of those who are infected, about 10 percent (0.1) have contracted the disease without contact with disease carriers. If the likelihood of contact with a disease carrier for a particular patient is 10 percent (0.1), then the likelihood of infection is approximately 19 percent (0.19).

The details of the deduction operator, $\circledcirc$, are described in [17]. The operator is written as $\omega_{h||e}=\omega_e \circledcirc (\omega_{h|e}, \omega_{h|\bar{e}})$.

Ref [17] being A. Jøsang and D. McAnally, "Multiplication and Comultiplication of Beliefs," *International Journal of Approximate Reasoning*, vol. 38, no. 1, pp. 19.51, 12004.

2) Abduction: Abduction reasons about the likelihood of a hypothesis, given knowledge of the likelihood of some evidence being observed when the hypothesis is true; the likelihood of the evidence being observed when the hypothesis is false; and the base rate of the hypothesis. Abductive reasoning is often applied to interpret medical test results. As an example, suppose that a specific disease has a base rate of 1/100 (i.e. one in every hundred people on average has the disease). A particular test for this disease has a false positive rate of 1/100 and a false negative rate of 1/50 (i.e. br(h)=0.01; p(e|h)=0.99; p(e| not h)=0.02). The false negative rate means for two percent of those who have the disease and are tested, the test will erroneously report that they do not have the disease.

Similarly, the false positive rate means that for one percent of those who do not have the disease and are tested, the test will erroneously report that they do have the disease. Under all other conditions, the test reports the results correctly. If the test is applied to a random person for whom it is not known if they have the disease, and the result is positive, then the likelihood that they actually have the disease is 1/3 or 0.0.33, and not 0.98 as might have been supposed if the base rate was ignored.

Figure 7:
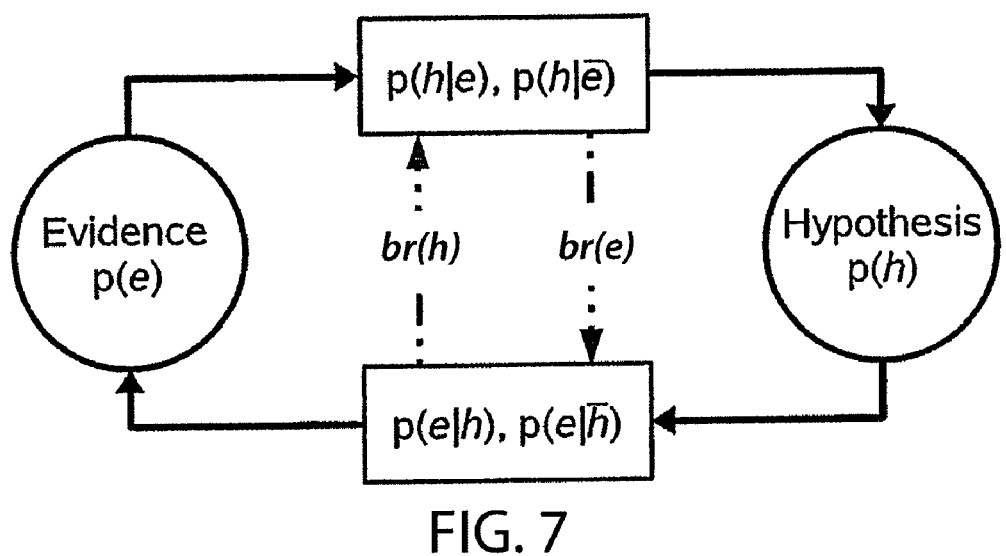
FIG. 7 is a diagram representing different conditionals needed for reasoning in different directions.
Figure 8:
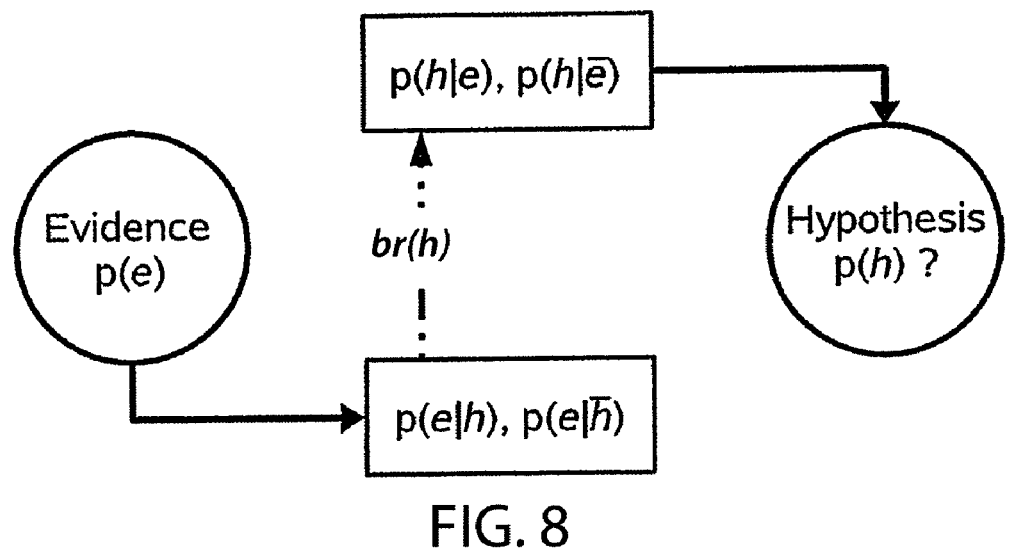
FIG. 8 is a diagram representing abductive reasoning from the evidence relating to the hypothesis.

Deriving the likelihood of the hypothesis from the logical conditionals p(h|e) and p(h|not e) and the likelihood of the evidence p(e) is straight-forward. Likewise, deriving the likelihood of the evidence from the logical conditionals p(e|h) and p(e|not h) and the likelihood of the hypothesis p(h) is also straightforward. However, deriving the likelihood of the hypothesis with only the logical conditionals, p(e|h) and p(e|not h), is not possible without knowledge of the base rate of the hypothesis br(h), as illustrated in FIG. 7. Using the knowledge of these three pieces of information, the logical conditionals p(h|e) and p(h|not e) can be derived, and the problem can solved using deduction, as illustrated in FIG.8.

Using Subjective Logic, the implicit logical conditionals that allow direct reasoning from the evidence to the hypothesis are derived and used with the deduction operator to obtain the correct result. The logical conditionals used for deducing the hypothesis from knowledge of the evidence, $\omega_{e|h}$ and $\omega_{e|not\ h}$, can be derived from knowledge of the supplied conditionals, $\omega_{h|e}$ and $\omega_{h|not\ e}$, and knowledge of the base rate of the hypothesis, br(h). The general derivation of deductive logical conditionals from abductive logical conditionals is summarized below.

Definition 5.1 (Abduction): Given knowledge of the base rate of the hypothesis br(h) where the $\omega_h$ is a vacuous subjective opinion about the base rate of the hypothesis, defined as $$\omega_h = (b_h, d_h, u_h, a_h) \begin{cases} b_h = 0 \\ d_h = 0 \\ u_h = 0 \\ a_h = br(h) \end{cases} \quad (V.9)$$

and given the abductive logical conditionals about evidence e, expressed in Subjective Logic form $\omega_{h|e}, \omega_{h|\bar{e}}$, then the deductive logical conditionals $\omega_{e|h}, \omega_{e|\bar{h}}$ are derived using the following formula $$\omega_{h|e} = \frac{\omega_h \cdot \omega_{e|h}}{\omega_h \circledcirc (\omega_{e|h}, \omega_{e|\bar{h}})} \quad (V.10)$$

$$\omega_{h|\bar{e}} = \frac{\omega_h \cdot \neg \omega_{e|h}}{\omega_h \circledcirc (\neg \omega_{e|h}, \neg \omega_{e|\bar{h}})}$$

and $\omega_h$ can be solved using the deduction operator (Section V-F.1) where $$\omega_{h||e}=\omega_e \circledcirc (\omega_{h|e}, \omega_{h|\bar{e}}) \quad (V.11)$$

The abduction operator, $\overline{\circledcirc}$, is written as $\omega_{h||e}=\omega_w \overline{\circledcirc} (\omega_{e|h}, \omega_{e|\bar{h}}, br(h))$. Details on the multiplication and division operators can be found in [24].

Ref. [24] being A. Jøsang and D. McAnally, "Multiplication and Comultiplication of Beliefs," *International Journal of Approximate Reasoning*, vol. 38, no. 1, pp. 19-51, 2004.

3) Consensus

The consensus operator is used for belief fusion. It allows independent beliefs to be combined into a consensus opinion which reflects all opinions in a fair and equal way, i.e. when there are two or more beliefs about hypothesis h resulting from distinct items of evidence, the consensus operator produces a consensus belief that combines them into one. For example, suppose that for the hypothesis, h, there two distinct items of evidence, e1 and e2, that are either causal or derivative with respect to the hypothesis. Assume that for each of item of evidence some inference is drawn about the likelihood of h (using deduction or abduction), then the two independent opinions, $\omega_h^{e_1}$ and $\omega_h^{e_2}$, can be fused into a single consensus opinion !h which provides an overall assessment of the likelihood of the hypothesis. The details of the consensus operator, ⊕, are described in A. Jøsang, "The Consensus Operator for Combining Beliefs," *Artificial Intelligence Journal*, vol. 142, no. 1.2, pp. 157-170, October 2002 and discussed further in A. Jøsang, M. Daniel, and P. Vannoorenberghe, "Strategies for Combining Conflicting Dogmatic Beliefs," in *Proceedings of the 6$^{th}$ International Conference on Information Fusion*, X. Wang, Ed., 2003. The operator is written as $\omega_h = \omega_h^{e1} \oplus \omega_h^{e2} \ldots \oplus \omega_h^{en}$.

The consensus operator applies to belief functions on binary frames of discernment, and coarsening is needed in case the original frame of discernment is larger than binary, (i.e. in cases where there are more than two possible hypotheses). The consensus operator can then be applied to individual elements in the original frame of discernment separately. However, inconsistency can sometimes occur because the coarsening process removes information. The normalisation then consists of normalizing the result of the consensus operator over all the individual elements. This is described in detail in A. Jøsang, S. Pope, and D. McAnally. *Normalising the Consensus Operator for Belief Fusion*, published in The Proceedings of the International Conference on Information Processing and Management of Uncertainty (IPMU2006).

Diagnosticity of Evidence

Not all evidence is created equal, some evidence is better for distinguishing between hypotheses than others. Evidence is considered to be diagnostic when it is indicative of the relative likelihood of the hypotheses being considered. If an item of evidence seems consistent with all the hypotheses, it will generally have little diagnostic value.

Heuer's Analysis of Competing Hypotheses describes a process by which diagnosticity is indicated by the analyst for each evidence-hypothesis pair. Under a fairly narrow interpretation, such as given by Stech and Elässer, the ACH process appears to consider only the assertion of each item of evidence h|e (i.e. the evidence is true), and does not consider its negation h|not e (i.e. the evidence is false). Under a broader interpretation, consideration of both logical conditionals is implied. Consider Heuer's medical analogy as an illustration of this point. A high temperature, e, might have little diagnostic value in determining which illness a person is suffering from, yet the absence of a high temperature, not e, may be more significant for distinguishing between possible illnesses.

In the background ACH process, diagnosticity is explicitly provided by the analyst as an input, and it is used both to eliminate evidence from the model that does not distinguish well between hypotheses, and to provide a means of eliminating hypotheses based on the relative weight of disconfirming evidence. These inputs are 'second-order' judgements, since the analyst must first consider the relationship between the item of evidence and the hypotheses in order to determine the diagnosticity of the item of evidence. This reasoning is usually hidden from the final analysis and may be subject to the cognitive limitations and biases which significantly contribute to errors in reasoning.

In the ACH-SL system of the present embodiment, diagnosticity is not explicitly provided by the analyst. Instead, it is derived from the 'first-order' values that the analyst assigns to the logical conditionals, independently of the actual value of the evidence. This allows analysts to concentrate on the judgements they make, rather than requiring them to consider diagnosticity as a separate, 'second-order' measure of the evidence.

Diagnosticity is represented as a real number between 0 and 1, with a value of 0 indicating that the evidence does not distinguish between the hypotheses in any way; and with a value of 1 indicating that the evidence is capable of completely distinguishing between the hypotheses.

Diagnosticity can also be derived for any subset of hypotheses and provides the analyst with detail as to how well the evidence distinguishes between the members of the subset. For example, the overall diagnosticity of an item of evidence may be poor in distinguishing between a set of six hypotheses, yet it may be very good at distinguishing between just two of those six.

Diagnosticity is derived using the logical conditionals p(h|e) and p(h|not e). If these conditionals are not known, then they can be derived from knowledge of the p(e|h) and p(e|not h), and from the base rate of the hypothesis br(h). Details on how diagnosticity is derived, including examples, are described further in the attached Appendix.

Figure 9:
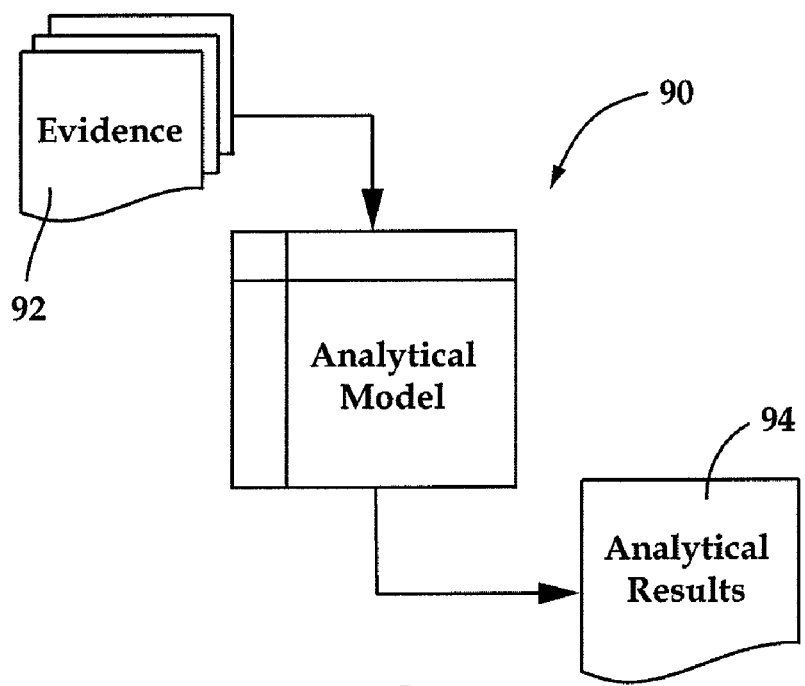
FIG. 9 is a block diagram showing the ACH-SL process of the second embodiment as an information transformation.

A second embodiment of the method of the invention, which focuses more on the preparation and use of the analytical model 90 as illustrated in FIG. 9, will now be described including in relation to a specific example. As discussed above, the analyst starts by deciding on an exhaustive and exclusive set of hypotheses to be considered. The term 'exhaustive and exclusive' refers to the condition that one of the hypotheses—and only one—must be true. The competing hypotheses may be alternative courses of action, adversarial intentions, force strength estimations, etc. Deciding on what hypotheses to include is extremely important. If the correct hypotheses are not included in the analysis, then the analyst will not get the correct answer, no matter how good the evidence. The issue of hypothesis generation proceeds as discussed in relation to the first embodiment.

Next, the analyst considers each hypothesis and lists its possible causal influences and diagnostic indicators. These form the items of evidence 92 that will be considered in the analysis. In deciding what to include, it is highly desirable not to limit the evidence to what is already known or believed to be discoverable. Since ACH-SL requires calculations that are generally too complex and time consuming to perform manually, an appropriate analytical framework that embodies ACH-SL—such as the software application developed by the inventors and named ShEBA—is highly recommended. Using this framework the analyst constructs an analytical model of how the evidence relates to the hypotheses. Not all evidence is created equal—some evidence is better for distinguishing between hypotheses than others. The degree to which evidence is considered diagnostic is the degree to which its presence or absence is indicative of one or more hypotheses. If an item of evidence seems consistent with all the hypotheses, it will generally have weak diagnostic value.

In ACH-SL system of the embodiment, diagnosticity is not explicitly provided by the analyst. Instead, it is derived from the 'first-order' values that the analyst assigns to a set of conditional beliefs for each combination of hypothesis hi and item of evidence ej. For causal evidence, the conditionals $\omega$hi|ej, $\omega$hi|not ej represent the beliefs that the hypothesis will be true, assuming that the item of evidence is true—and the belief that the hypothesis will be true, assuming the item of evidence is false. For derivative evidence, $\omega$ej|hi represents the belief that the item of evidence will be true, assuming that the hypothesis is true. In forming the conditionals for an item of evidence, the analyst must separate out their understanding of the item of evidence under enquiry from the general set of evidence to be considered, i.e. the analyst must not consider the significance of other evidence when forming the conditionals. Failure to do so can bias the analysis.

The choice of whether an item of evidence should be treated in a causal or derivative manner is immaterial to the calculations—the style of reasoning that produces the least cognitive load should be the primary consideration. Analysts can choose to make statements about combinations of hypotheses such as ω(h2∨h3)|e2, but not for combinations of evidence since this would likely introduce bias.

It is notable that a distinction can be made between events that can be repeated many times and events that can only happen once. Conditionals for events that can be repeated many times are frequentist events and can be expressed as simple Bayesian beliefs if there can be absolute certainty regarding their values. However, expressing a conditional as a frequentist probability seems to be a meaningless notion when the consequent is an event that can only happen once. Even when the conditionals are calculated from a very large set of data, the possibility remains that the evidence at hand does not provide complete information about these conditionals, and can not be expressed on a purely frequentist form. For events that can only happen once—including almost all problems of intelligence analysis—the observer must arbitrarily decide what the conditionals should be, and consequently there can be a great deal of uncertainty about their values. For these non-frequentist problems, each conditional is usually expressed as a maximized uncertainty belief, where the uncertainty of the belief is set to the maximum allowable amount for the desired probability expectation value. Therefore, the conditionals for any problem can usually be provided by the analyst as simple scalar probabilities—i.e. p(hi|ej), p(hi|not ej)—and the uncertainty maximization can be handled by the analytical system.

Regardless of how the conditionals for the hypotheses are specified—derivative or causal, single or multi-hypothesis, zero-uncertainty or uncertainty maximized—the conditionals can be expressed (within the internals of the analytical framework) as a 'normalised' set of ωhi|ej, ωhi|not ej conditionals as depicted in FIGS. 10A and 10B for an example). Note that in FIG. 10A, e1 has derivative conditionals and that for e2, a single pair of conditionals has been specified for the combination of h2∨h3. FIG. 10B is the equivalent representation of FIG. 10B with all individual conditionals generated by a normalisation transform. The base rate of each hypothesis is represented by br(hi). The complete set of conditionals for all items of evidence and all hypotheses constitutes the analytical model.

After completion of the analytical model 90, it can be used to evaluate a complete or incomplete set of evidence. The inputs to the analytical model are a set of observable evidence 92, where E={ωe1, ωe2, ... ωek}. The value of each item of evidence can be highly certain or uncertain, with varying degrees of likelihood, depending on the reliability of the sources of information for the evidence, the presumed accuracy of the sources' observations, the currency of the information, and other factors which will be discussed later. Evidence for which no data is available is expressed as a vacuous belief that is completely uncertain.

The primary output of the analysis is a set of n beliefs 94 H={ωh1, ωh2, ... ωhn}, representing the certainty and likelihood of each hypothesis. In addition, intermediate analytical items are available, including separate analytical results for each combination of n hypotheses and m items of evidence, i.e.

$$H\|E=\{\omega h1\|e1, \omega h1\|e2, \ldots \omega h1\|em, \omega h2\|e1, \omega h2\|e2, \ldots \omega hn\|em\} \qquad (11)$$

Figure 11:
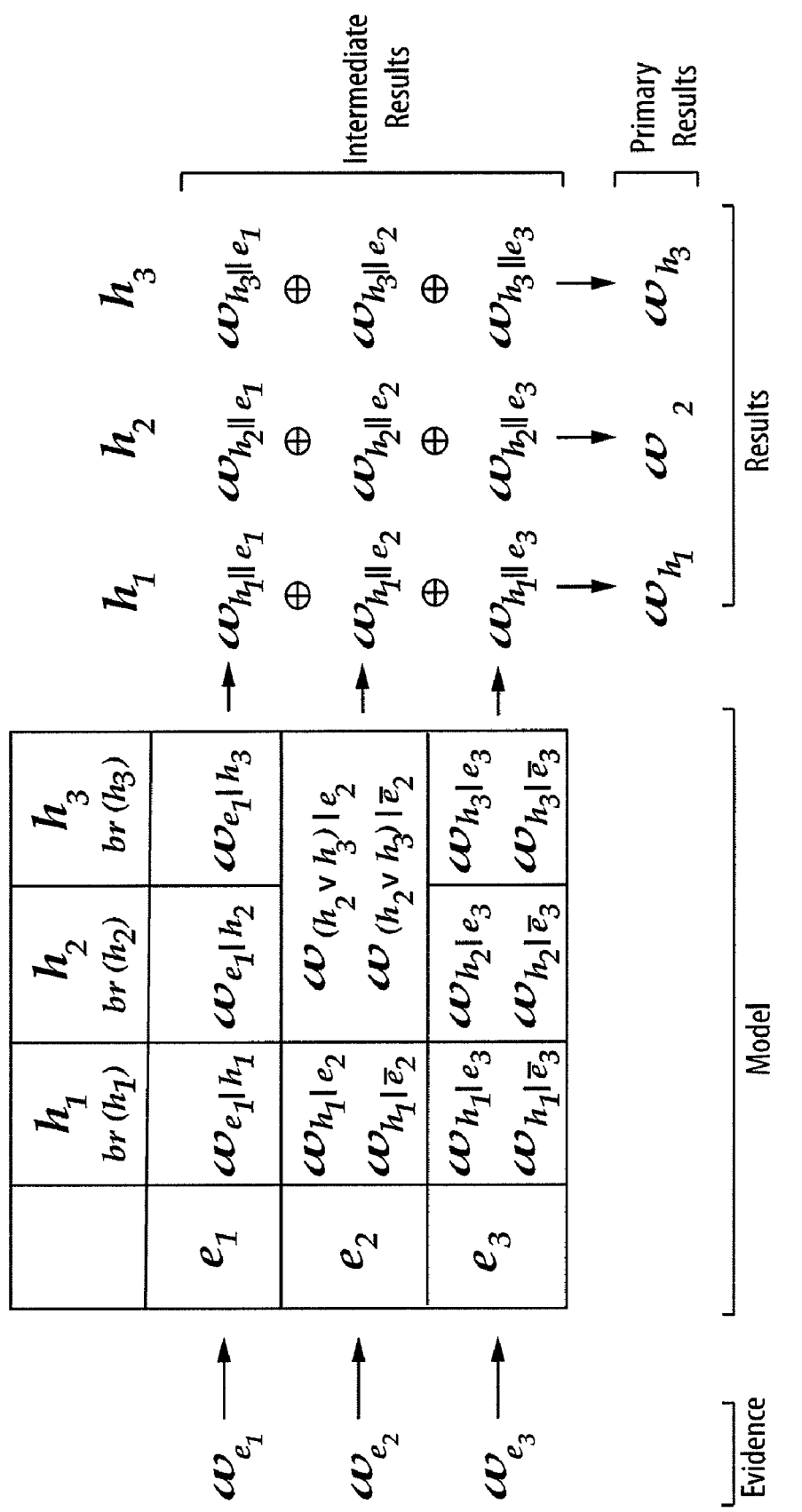
FIG. 11 depicts an abstraction of the generation of intermediate and primary results from the model of FIGS. 10A and 10B.

Deriving the primary results from an analytical model and a set of evidence is a two-step process. FIG. 11 shows how both the intermediate and primary results are derived from the combination of a set of evidence and the analytical model. In particular generation of intermediate and primary results from the ACH-SL model in FIG. 10B, and values for the evidence e1, e2, e3. The primary results are a result of belief fusion E ⊚ [23] of the intermediate results for each hypothesis. First, a set of intermediate results ωhi||ej are calculated for each pair of conditionals in the analytic model. Different but equivalent formulas for calculation are used depending on whether the conditionals are causal or derivative. For causal conditionals, ωhi||ej is calculated using the deduction operator ▪. For derivative conditionals, ωhi||ej is calculated using the abduction operator ▪.

$$\omega hi\|ej = \omega ej\ \blacksquare\ (\omega hi|ej, \omega hi|\text{not } ej) \qquad (12)$$

$$\omega hi\|ej = \omega ej\ \blacksquare\ (\omega ej|hi, \omega ej|\text{not } hi, br(hi)) \qquad (13)$$

The second and last step of the process involves fusing the intermediate results for each hypothesis hi using the consensus operator ⊕[23] to obtain the overall belief in each hypothesis ωhi.

$$\omega hi = \omega hi\|e1 \oplus \omega hi\|e2 \ldots \oplus \omega hi\|em \qquad (14)$$

ACH-SL Metrics and Their Uses

In the background ACH approach, after the primary analytical results are calculated, it is recommended that the analyst perform additional analysis to determine how sensitive the results are to a few pieces of crucial evidence. While the basic ACH approach does not elaborate on the methods for doing this, the ACH-CD approach provides computed indicators of possible vulnerabilities for deception. Similarly, ACH-SL provides a number of metrics that are useful in indicating the sensitivity of the conclusions, the possibility of misperception or deception, and the explanatory power of the chosen hypotheses.

Two key metrics that can be derived from the analytical model without the need to consider either the beliefs of either the items of evidence or the analytical results, are are diagnosticity and sensitivity:

Diagnosticity is a measure of how well an item of evidence is capable of distinguishing between a chosen subset of hypotheses. As an aid for intelligence collection, diagnosticity is most useful as a guide for which evidence would be useful for analysing a particular problem.

Sensitivity is most useful for analysing the sensitivity of the results. It is a measure of the relative influence of a single item of evidence on the primary results for a subset of hypotheses {ωh1, ωh2, ... ωhn}. It provides an indication of the degree to which the value of the calculated beliefs could change if the item of evidence ej were to alter in value.

In addition, here are a number of useful metrics that can be derived after the primary and intermediate analytical results are calculated, specifically support, concordance, and consistency:

Support is a measure of the degree to which an intermediate analytical result ωhi||ej supports or opposes the primary result for the hypothesis ωhi. A positive measure indicates support while a negative result indicates opposition.

Concordance is a measure of the current and potential similarity of a set of beliefs. Beliefs that are completely concordant are exactly the same expectations and base rates, while those with partial or no concordance have different expectations, certainties, or base rates.

Consistency is a measure of how well the primary result for a hypothesis ωhi is supported by the intermediate results for each item of evidence:

$$hi\|E=\{\omega hi\|e1, \omega hi\|e2, \ldots \omega hi\|ek\}.$$

With the exception of diagnosticity, the details of these metrics are not discussed further in this document. Details on diagnosticity, and examples of calculations of diagnosticity are available in the Appendix.

EXAMPLE

Figure 12:
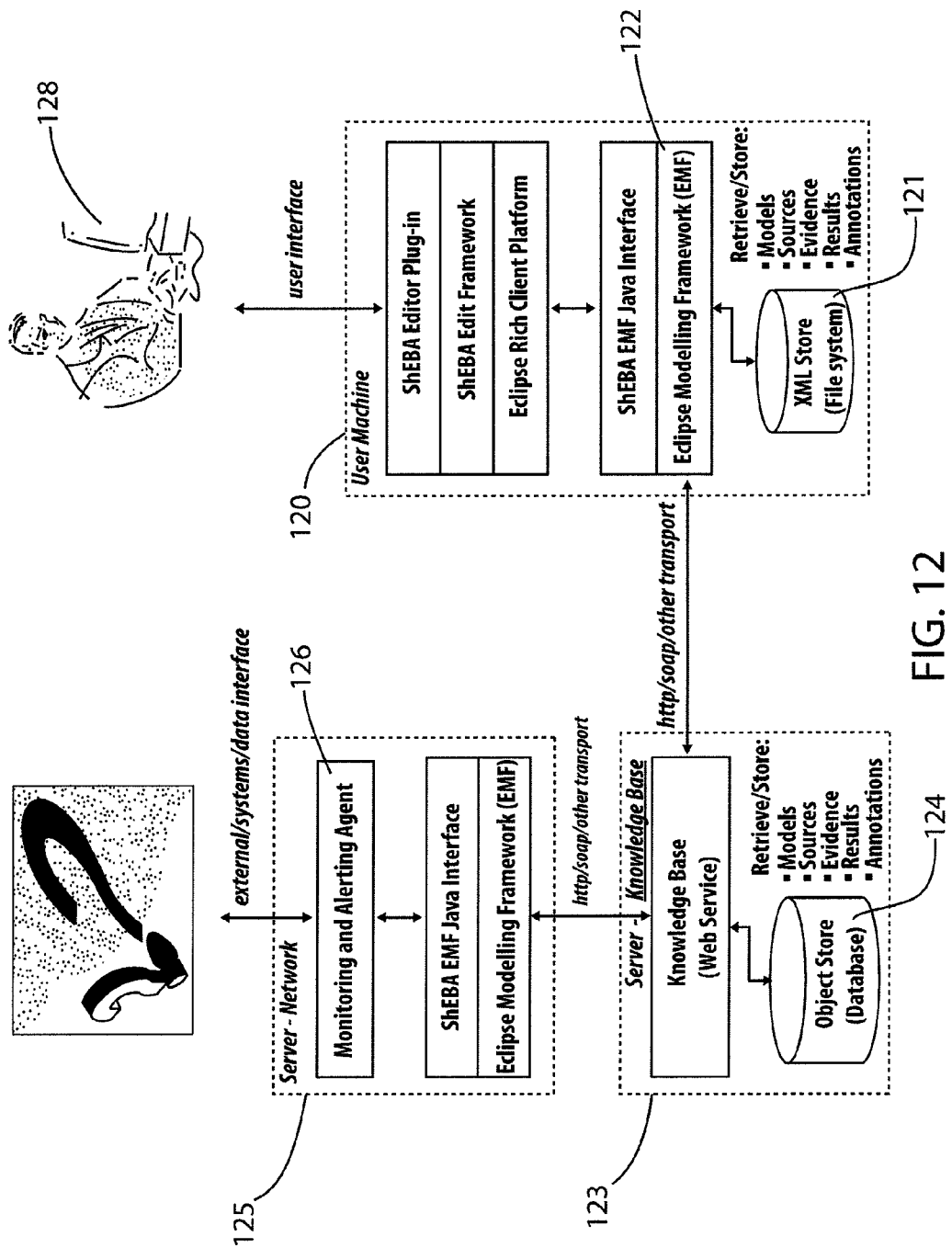
FIG. 12 is a diagram showing a system for implementing the model of the second embodiment as a software application.

The following example illustrates construction of a simple model using the method and employing the ShEBA software application. The software application is implemented in the Eclipse modelling framework and is hosted on the computer-based system depicted in FIG. 12. The system of FIG. 12 includes a user machine 120 which provides local processing and storage facilities. The user machine includes an XML store 121 in local file system storage and a client modelling framework software module, such as Eclipse Modelling Framework (EMF) 122. The user machine 120, which may be one of several user machines, is coupled to a knowledge base server 123 which provides access to an object store 124 in the form of a database. The database server facilitates the retrieval and storage of models, sources, evidence, results and associated annotations. In turn, the knowledge base server 123 is coupled to a network server 125 which executes monitoring and alerting agent software module 126 for interfacing with external systems and/or data sources 127, such as messaging, logging or autonomous response systems.

The example is framed as part of a Blue Force/Red Force military exercise. It is assumed that the Blue Force Commander wants to know what Red Force is doing in or around Position X, which may be a bridge or other strategic location. The steps of the method of the second embodiment, discussed in abstract above, are undertaken.

Produce the Set of Hypotheses

The following are an exhaustive and exclusive set of hypotheses that have been chosen by the Blue Force Commander to answer the question of "What is Red Force doing in or around Position X?"

$h_1$ ⓡ Red Force is attacking from Position X
$h_2$ ⓡ Red Force is defending Position X
$h_3$ ⓡ Red Force is withdrawing from Position X Assignment of Base Rates to Hypotheses In the absence of empirical data, the principle of indifference will be used to assign base rates to each of the hypotheses in the example. Each hypothesis $(h_1, h_2, h_3)$ will be assigned a base rate of ⅓, making the required total probability of 1 that either $h_1$ or $h_2$ or $h_3$ is true, as shown in Table 1.

TABLE 1

| Hypothesis | Base Rate |
|---|---|
| $h_1$ | ⅓ |
| $h_2$ | ⅓ |
| $h_3$ | ⅓ |

Items of Evidence

Knowledge of the following items of evidence would tend to either support or disconfirm one or more of the hypotheses:

$E_1$ ⓡ Offensive capabilities of Red Force:
  $e_1$ ⓡ Red Force has good offensive capability; or
  $\bar{e}_1$ ⓡ Red Force has poor offensive capability.
$E_2$ ⓡ Security of Red Force supply lines to Position X:
  $e_2$ ⓡ Red Force supply lines to Position X are secure; or
  $\bar{e}_2$ ⓡ Red Force supply lines to Position X are insecure.
$E_3$ ⓡ Visual confirmation of Red Force units at Position X:
  $e_3$ ⓡ Red Force units spotted at Position X; or
  $\bar{e}_3$ ⓡ Red Force units not spotted at Position X.

Assignment of Base Rates to Items of Evidence

For example purposes, the principle of indifference will be used to also assign base rates to each alternative for each of the items of evidence in the example. Each alternative $(e_i, \bar{e}_i)$ will be assigned a base rate of ½, making the required total probability of 1 that either $e_i$ or $\bar{e}_i$ is true.

TABLE 2

| Item of Evidence | | Base Rate |
|---|---|---|
| $E_1$ | $e_1$ | ½ |
| | $\bar{e}_1$ | ½ |
| $E_2$ | $e_2$ | ½ |
| | $\bar{e}_2$ | ½ |
| $E_3$ | $e_3$ | ½ |
| | $\bar{e}_3$ | ½ |

Deciding on the Treatment of Each Item of Evidence

The Blue Force Commander must decide how each item of evidence should be treated. Whether an item of evidence is treated as causal or diagnostic is unimportant from a computational perspective. The assignment of causal or diagnostic treatment simplifies the cognitive load for the Blue Force Commander and therefore reduces the possibility of errors in reasoning.

The Blue Force Commander determines that:
1. "Offensive capabilities of Red Force" should be treated as a causal influence, since it likely will be a determinant of whether or not the Red Force Commander will launch an offensive.
2. "Security of Red Force supply lines to Position X" should be treated as a causal influence, since it likely will be a determinant of whether or not the Red Force Commander will launch an offensive or defend Position X.
3. "Visual confirmation of Red Force units at Position X" should be treated as a diagnostic indicator since visual confirmation of Red Force units may be an indication of whether or not units have been withdrawn, are preparing an attack, or defending.

Assigning Judgements Concerning Each Item of Evidence to the Set of Hypotheses

The Blue Force Commander creates a set of conditionals for each item of evidence and chosen subset of hypotheses, as shown in Table 3. Note that each subset of hypotheses contains at least one hypothesis.

First judgements are assigned to evidence to be treated as a causal influence, as set out in Table 3 below:

TABLE 3

| Item of Evidence | | | $h_1$ (attack) | $h_2$ (defend) | $h_3$ (withdraw) |
|---|---|---|---|---|---|
| $E_1$ | Offensive Capability | $e_1$ Good capability | 0.775 | | 0.225 |
| | | $\bar{e}_1$ Poor capability | 0.225 | | 0.775 |
| $E_2$ | Security of Supply Lines | $e_2$ Secure | 0.9 | | 0.1 |
| | | $\bar{e}_2$ Insecure | 0.225 | | 0.775 |

1. The Blue Force Commander reasons about their Offensive Capability thus:
   a. If Red Force has good offensive capability, it is likely (0.775) that they will attack.
   b. However, if they have poor capability, then it is unlikely (0.225) that they will attack.
   c. Therefore, if Red Force has good offensive capability, it is unlikely (0.225) that they will either defend or withdraw, but if they have poor offensive capability, then it is likely (0.775) that they will either defend or withdraw.
2. The Blue Force Commander reasons about the security of their supply lines thus:

a. If Red Force has secure supply lines then it is very unlikely (0.1) that they will withdraw.
b. However, if the supply lines are insecure, then it is likely (0.775) that they will withdraw.
c. Therefore, if Red Force has secure supply lines, it is very likely (0.9) that they will either attack or defend, but if they have insecure supply lines, then it is unlikely (0.225) that they will either attack or defend.

Then judgements are assigned to evidence to be treated as diagnostic indicators, as shown in Table 4 below:

TABLE 4

| Item of Evidence | | $h_1$ (attack) | $h_2$ (defend) | $h_3$ (withdraw) |
|---|---|---|---|---|
| $E_3$ Visual confirmation | $e_3$ Units spotted | 0.5 | 0.9 | 0.35 |

3. The Blue Force Commander reasons about Visual Confirmation of Red Force units thus:
   a. If Red Force is launching an attack, then the chances are about even (0.5) that Red Force Units will be spotted at Position X.
   b. If Red Force is defending Position X, then it is very likely (0.9) that Red Force Units will be spotted at Position X.
   c. If Red Force is withdrawing, then it is somewhat unlikely (0.35) that Red Force Units will be spotted at Position X.

Assessing the Belief for Each Item of Evidence Being True

The Blue Force Commander receives intelligence reports on the position of Red Force units; assesses the capabilities and known allocation of Red Force units to locations other than Position X; and looks at the distance of Position X from Red Force support units. The Blue Force Commander then assigns belief to each of the items of evidence as shown in Table 5:

TABLE 5

| | Item of Evidence | Interpretation | Likelihood | Certainty | Base Rate |
|---|---|---|---|---|---|
| $e_1$ | Red Force has good offensive capability | That Red Force has good offensive capability is somewhat likely (0.65), with a very high degree of certainty (0.95). | 0.65 | 0.95 | 0.5 |
| $e_2$ | Red Force supply lines are secure | That Red Force has secure supply lines is likely (0.775), with a high degree of certainty (0.8). | 0.775 | 0.8 | 0.5 |
| $e_3$ | Red Force units spotted at Position X | That Red Force units have been spotted at Position X is likely (0.775), with a very high degree of certainty (0.95). | 0.775 | 0.95 | 0.5 |

Deciding the Set of Interim Beliefs and in Each Hypothesis for Each Item of Evidence The conditionals for each item of evidence and subset of hypotheses have an equivalent expression as Subjective Logic beliefs as follows in Table 6:

TABLE 6

| Item of Evidence | | | $h_1$ (attack) | $h_2$ (defend) | $h_3$ (withdraw) |
|---|---|---|---|---|---|
| $E_1$ Offensive Capability | $e_1$ | Good capability | $\omega h_1 | e_1$ | | $\omega(h_2 v h_3) | e_1$ |
| | $\bar{e}_1$ | Poor capability | $\omega h_1 | \bar{e}_1$ | | $\omega(h_2 v h_3) | \bar{e}_1$ |
| $E_2$ Security of Supply Lines | $e_2$ | Secure | $\omega(h_1 v h_2) | e_2$ | | $\omega h_3 | e_2$ |
| | $\bar{e}_2$ | Insecure | $\omega(h_1 v h_2) | \bar{e}_2$ | | $\omega h_3 | \bar{e}_2$ |
| $E_3$ Visual confirmation | $e_3$ | Units spotted | $\omega e_3 | h_1$ | $\omega e_3 | h_2$ | $\omega e_3 | h_3$ |

Where:

$\omega h_1 | e_1 = (0.66, 0, 0.34, 0.3334)$ $\omega h_1 | \bar{e}_1 = (0, 0.34, 0.66, 0.3334)$ $\omega(h_2 v h_3) | e_1 = (0, 0.33, 0.67, 0.6666)$ $\omega(h_2 v h_3) | \bar{e}_1 = (0.33, 0, 0.67, 0.6666)$ $\omega(h_1 v h_2) | e_2 = (0.7, 0, 0.3, 0.6666)$ $\omega(h_1 v h_2) | \bar{e}_2 = (0, 0.33, 0.67, 0.6666)$ $\omega h_3 | e_2 = (0, 0.7, 0.3, 0.3334)$ $\omega h_3 | e_2 = (0.66, 0, 0.34, 0.3334)$ $\omega e_3 | h_1 = (0, 0, 1, 0.5)$ $\omega e_3 | h_2 = (0.8, 0, 0.2, 0.5)$ $\omega e_3 | h_3 = (0, 0.3, 0.7, 0.5)$ The beliefs in the items of evidence, expressed in Subjective Logic notation, are as follows in Table 7:

TABLE 7

| Item of Evidence | Belief |
|---|---|
| $e_1$ Red Force has good offensive capability | $\omega e_1 = (0.625, 0.325, 0.05, 0.5)$ |
| $e_2$ Red Force supply lines are secure | $\omega e_2 = (0.675, 0.125, 0.2, 0.5)$ |
| $e_3$ Red Force units spotted at Position X | $\omega e_3 = (0.75, 0.2, 0.05, 0.5)$ |

The conditional inference (or deduction) operator is used to calculate the interim beliefs in each hypothesis for each item of evidence that is to be treated as a causal influence. For evidence that is to be treated as a diagnostic indicator, the reverse conditional inference (or abduction) operator is used to calculate the interim beliefs.

Therefore after applying these operators to the above data, the interim beliefs in each hypothesis for each item of evidence will be as shown in Table 8:

TABLE 8

| $h_1$ (attack) | $h_2$ (defend) | $h_3$ (withdraw) |
|---|---|---|
| $\omega h_1 \| e_1$ = (0.425, 0.105, 0.47, 0.3334) | $\omega h_2 \| e_1$ = (0.05, 0.47,, 0.48, 0.3334) | $\omega h_3 \| e_1$ = (0.05, 0.47, 0.48, 0.3334) |
| $\omega h_1 \| e_2$ = (0.07, 0.03, 0.63, 0.3334) | $\omega h_2 \| e_2$ = (0.07, 0.3, 0.63, 0.3334) | $\omega h_3 \| e_2$ = (0.16, 0, 0.84, 0.3334) |
| $\omega h_1 \| e_3$ = (0.02, 0.1, 0.88, 0.3334) | $\omega h_2 \| e_3$ = (0.2, 0.16, 0.64, 0.3334) | $\omega h_3 \| e_3$ = (0.06, 0.3, 0.64, 0.3334) |

Deciding the Overall Belief in Each Hypothesis

Applying the consensus operator to the interim beliefs (above) allows the final calculation of the overall beliefs in each hypothesis:

$$\omega h_1 \to (0.36, 0.29, 0.35, 0.3334)$$

$$\omega h_2 \to (0.16, 0.53, 0.31, 0.3334)$$

$$\omega h_3 \to (0.13, 0.51, 0.36, 0.3334)$$

These Subjective Logic beliefs have an interpretation according to probability theory as augmented Beta distributions, and therefore the likelihood of the three hypotheses can be simply expressed thus:

$$P(h_1) = 0.48$$

$$P(h_2) = 0.27$$

$$P(h_3) = 0.25$$

Figure 13:
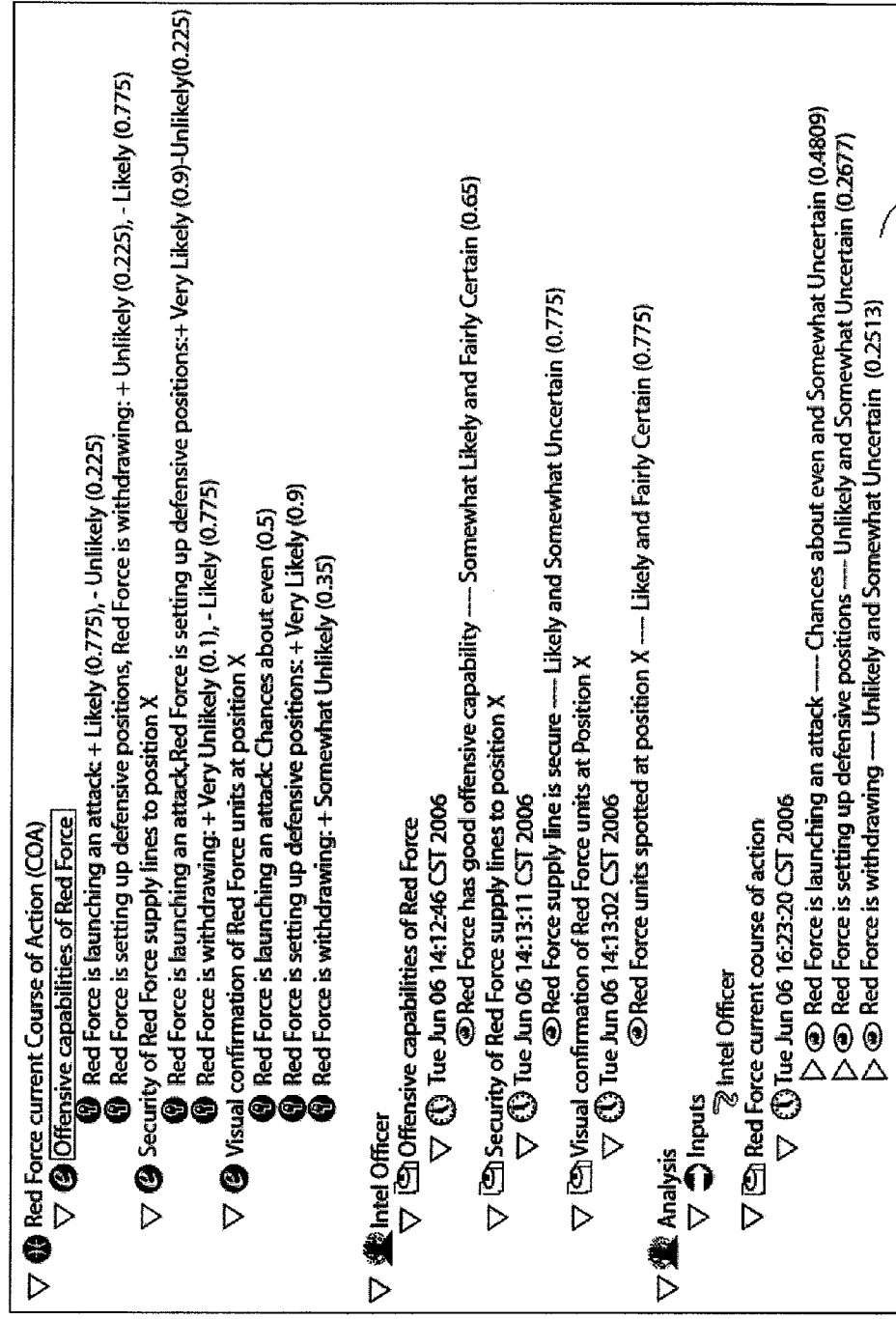
FIG. 13 illustrates a screen display generated by the prototype software application ShEBA for a modelling example involving intelligence in a military setting.

A screen display 130 produced by the prototype ShEBA software is illustrated in FIG. 13, showing the manner in which the interface of the embodiment outputs or presents data and results 131 to an analyst user on a visual display unit 128 of user machine 120.

In summary, Heuer's background ACH process describes a general process that is largely independent of technology and may be used by analysts that have little more than 'pen and paper' at their disposal. By contrast, the ACH-SL process of the preferred embodiment is highly dependent on technology to perform Subjective Logic calculations that would be highly complex and time-consuming if they were performed manually. ACH-SL may be most conveniently implemented as a functioning software application.

The invention suitably couples the use of Subjective Logic with the Analysis of Competing Hypotheses (ACH) approach as a basis for reasoning about alternative hypotheses as part of the process of intelligence analysis, an approach referred to as ACH-SL. The inventors also believe that the ACH-SL approach allows uncertainty of evidence, opinion about their influences, and the resultant conclusions to be expressed in both quantitative and qualitative forms that are applicable for human and machine interpretation. The invention further demonstrates that 'diagnosticity of evidence' can be derived from this approach and need not be considered as a separate input to the process, except as a means of limiting the initial set of evidence to be considered for inclusion into the model.

The software implementation, known as ShEBA, provides a framework for the analysis of multiple hypotheses with multiple items of evidence. The Subjective Logic calculus used by the system provides a means of translating between both terms used by human agents, and Bayesian data used by other systems. The ability to express calculated opinions in everyday human terms allows the model and results to be more easily translated into appropriate language for presentation to policy makers and other non-analysts.

ACH-SL uses a formal calculus, known as Subjective Logic to make recommendations about the likelihoods of the hypotheses, given individual analyst judgements, uncertain knowledge about the value of the evidence, and multiple items of evidence. In addition, ACH-SL derives measures of diagnosticity for each item of evidence with respect to the hypotheses directly from the judgements that analysts make, rather than requiring them to consider diagnosticity as a separate, second-order measure of the evidence.

ACH-SL allows analysts to apply both deductive or abductive reasoning, and minimize the errors that often occur as a result of consideration of only one logical conditional. The ability of ACH-SL to allow both approaches helps to ensure that the individual tasks undertaken by analysts require less possible cognitive effort. This in turn allows analysts to focus on the judgements they make to produce higher quality analysis as a result.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein and defined in the claims which follow.

APPENDIX

Definitions, Theorems, Proofs and Examples

A. Equivalence of Bayesian and Subjective Opinion

Definition 1.1: Any pure bayesian opinion $\phi = (r, s)$ with base rate $br(\phi) = \alpha^\phi$ can be transformed into a subjective opinion $\omega = (b, d, u)$ with base rate $br(\omega) = \alpha^\omega$ using the transformation function $\mathcal{F}(\phi) = \omega[11]$.

$$\mathcal{F}(\varphi) = \omega = (b, d, u) \begin{cases} b = \dfrac{r}{r+s+2} \\ d = \dfrac{s}{r+s+2} \\ u = \dfrac{2}{r+s+2} \\ a^\omega = a^\varphi \end{cases} \quad (A-1)$$

Corollary 1.2: Any subjective opinion $\omega = (b, d, u)$ can be transformed into a pure bayesian $\phi = (r, s)$ using the transformation function $\mathcal{F}'(\omega) = \phi$[11].

[11]Erratum in the published version, corrected in this version $$\mathcal{F}'(\omega) = \varphi = (r, s) \begin{cases} r = \dfrac{2b}{u} \\ s = \dfrac{2d}{u} \\ a^\varphi = a^\omega \end{cases} \quad (A-2)$$

B. Logical Conditionals

Logical conditionals are pairs of conditional beliefs that are used for reasoning about the likelihood of a hypothesis, given some evidence. There are two types of logical conditionals used in inductive reasoning—abductive and deductive conditionals—and they have different mathematical requirements placed on their values as a result. This section will define the mathematical requirements and constraints for both types of logical conditionals.

1) *Deductive Logical Conditionals*: The logical conditionals used for deduction, $p(h_i|e)$ and $p(h_i|\bar{e})$, must obey certain mathematical constraints in order to satisfy basic requirements of probability theory. For a complete set of hypotheses where one and only one hypothesis can be true, it logically follows that the sum of the probability expectations of the positive conditionals must be one; and similarly the probability expectations of the negative conditionals must also sum to one, i.e.

$$p(h_1|e)+p(h_2|e)+\ldots p(h_n|e)=1$$

$$p(h_1|\bar{e})+p(h_2|\bar{e})+\ldots p(h_n|\bar{e})=1$$

Definition 1.3 (Deductive Logical Conditionals): Let $\Phi=\{h_1, h_2, \ldots h_k\}$ be a complete set of k hypotheses where one and only one $h_i \in \Phi$ is true. Then the logical conditionals used for deduction on a single item of evidence, e ($\omega_{h_i|e}$ and $\omega_{h_i|\bar{e}}$), must obey the following mathematical constraints $$\sum_{n=1}^{n=k} E(\omega_{h_n|e}) = 1 \quad (A-3)$$

$$\sum_{n=1}^{n=k} E(\omega_{h_n|\bar{e}}) = 1$$

2) *Abductive Logical Conditionals*: The logical conditionals used for abduction, $p(e|h_i)$ and $p(e|\bar{h}_i)$, have different constraints to deductive logical conditionals and there is no requirement that the probability expectations of their positive conditionals sum to one, so the probability expectation of the positive conditional $p(e|h_i)$ may be unconstrained for each hypothesis. However, the probability expectation of each negative conditional $p(e|\bar{h}_i)$ must be equal to the average of the probability expectations of the other positive conditionals of the other hypotheses, i.e.

$$p(e|\bar{h}_1) = \frac{p(e|h_2) + p(e|h_3) + \ldots p(e|h_n)}{n-1} \quad (A-4)$$

Definition 1.4 (Abductive Logical Conditionals): Let $\Phi=\{h_1, h_2, \ldots h_k\}$ be a complete set of k, (k>1) hypotheses where one and only one $h_i \in \Phi$ is true. Then the logical conditionals used for abduction on a single item of evidence, e ($\omega_{e|h}$, and $\omega_{e|\bar{h}}$), must obey the following mathematical constraints $$\forall h_i, h_i \in \Phi, E(\omega_{e|\bar{h}_i}) = \frac{\sum_{n=1}^{n=k} E(\omega_{e|h_n}) - E(\omega_e | h_i)}{k-1} \quad (A-5)$$

and consequently, the following two conditions must also hold true $$E(\omega_{e|h_i}) = \sum_{n=1}^{n=k} E(\omega_{e|\bar{h}_n}) - (k-1) \cdot E(\omega_{e|\bar{h}_i}) \quad (A-6)$$

$$\sum_{n=1}^{n=k} E(\omega_{e|h_n}) = \sum_{n=1}^{n=k} E(\omega_{e|\bar{h}_n}) \quad (A-7)$$

C. Model Coherence

The belief values assigned to the deductive logical conditionals of different items of evidence for the same hypothesis must share a common overlapping range for the model to be coherent. If there is no common overlap in the ranges of belief assigned to the logical conditionals, then at least one of the logical conditionals of either item of evidence must be incorrect Definition 1.5 (Model Coherence): Let $\Phi=\{h_1, h_2, \ldots h_k\}$ be a state space for a set k hypotheses where one and only one $h_i \in \Phi$ is true. Let $\xi=\{e_1, e_2, \ldots e_n\}$ be a set of n items of evidence. Then a model is defined to be coherent for a hypothesis, $h_i$, if and only if $$\text{lower}(h_i) \leq \text{upper}(h_i) \quad (A-8)$$

where the upper bound, upper($h_i$) and the lower bound, lower ($h_i$) are defined as $$\text{lower}(h_i)=\max(\forall e_j \in \xi, \min(p(h_i|e_j), p(h_i|\bar{e}_j)))$$

$$\text{upper}(h_i)=\min(\forall e_j \in \xi, \max(p(h_i|e_j), p(h_i|\bar{e}_j))) \quad (A-9)$$

D. Diagnosticity

Diagnosticity is a measure of how well evidence distinguishes between hypotheses, based on knowledge of the logical conditionals $p(h_i|e)$ and $p(h_i|\bar{e})$.

Definition 1.6 (Diagnosticity of evidence): Let $\Phi=\{h_1, h_2, \ldots h_k\}$ be a state space for a set k hypotheses where one and only one $h_i \in \Phi$ is true. Let $\Omega^\Phi = \{\theta_1, \theta_2, \ldots \theta_m\}$ be the corresponding set of m state spaces for a single item of evidence, e (where $\theta_i = \{e_i, \bar{e}_i\}$, $\theta_i \in \Omega^\Phi$) that represent the conditionals $\omega_{h_i|e}$, $\omega_{h_i|\bar{e}}$ for each hypothesis $h_i \in \Phi$. Then we define the diagnosticity of the evidence e with respect to an arbitrary subset of hypotheses $H \subseteq \Phi$ and $H \subseteq \Phi$ with elements k>0 to be $$D(e, H) = \begin{cases} E_{total}(e, H) = 0, & 0; \\ E_{total}(e, H) > 0, & \dfrac{\sum_{n=1}^{n=k} |E(\omega_{h_n|e}) - E(\omega_{h_n|\bar{e}}) - D_{mean}(e, H)|}{E_{total}(e, H)} \end{cases} \quad (A-10)$$

where $D_{mean}(e, H)$ is the mean of the sum of the differences, and $E_{total}(e, H)$ is the sum of their expectations, defined respectively as $$D_{mean}(e, H) = \frac{\sum_{n=1}^{n=k} |E(\omega_{h_n|e}) - E(\omega_{h_n|\bar{e}})|}{k} \quad (A-11)$$

$$E_{total}(e, H) = \sum_{n=1}^{n=k} [E(\omega_{h_n|e}) - E(\omega_{h_n|\bar{e}})] \quad (A-12)$$

Then the diagnosticity of the evidence e with respect to an arbitrary subset of hypotheses H can be rewritten as (substituting A-11 and A-12 into A-10):

$$D(e, H) = \frac{\sum_{n=1}^{n=k} \left| E(\omega_{h_n|e}) - E(\omega_{h_n|\bar{e}}) - \sum_{n=1}^{n=k} \left[ \frac{|E(\omega_{h_n|e}) - E(\omega_{h_n|\bar{e}})|}{k} \right] \right|}{\sum_{n=1}^{n=k} [E(\omega_{h_n|e}) - E(\omega_{h_n|\bar{e}})]} \quad (A\text{-}13)$$

Remark 1.7: It can be seen that $D(e, H) \in [0 \ldots 1]$ where a value of zero indicates that the evidence lends no weight to any of the hypotheses, while a value of 1 indicates that at extreme values for the evidence (i.e. $E(\omega_e)=0 \vee E(\omega_e)=1$), one of the hypotheses, $h_i \in H$, will be absolutely true and for the other extreme, one or more will be absolutely false.

Lemma 1.8 (Diagnosticity of evidence for a complete set of hypotheses): The diagnosticity of the evidence e for a complete set of hypotheses $\Phi$ can be expressed in a simplified form as $$D(e, \Phi) = \frac{\sum_{n=1}^{n=m} |E(\omega_{h_n|e}) - E(\omega_{h_n|\bar{e}})|}{2} \quad (A\text{-}14)$$

Proof: For a complete set of hypotheses, where $k=m$, $P=\Phi$, the sum of the expectations of the conditionals will be exactly two, (i.e. $E_{total}(x, \Phi)=2$) since $$\sum_{n=1}^{n=m} E(\omega_e) = 1, \quad \sum_{n=1}^{n=m} E(\omega_{\bar{e}}) = 1 \quad (A\text{-}15)$$

and also $D_{mean}(e, \Phi)=U$, since $$\sum_{n=1}^{n=m} [E(\omega_{h_n|e}) - E(\omega_{h_n|\bar{e}})] = 0$$

So the diagnosticity of the evidence e for a complete set of hypotheses $\Phi$ can be simplified from A-13:

$$D(e, \Phi) = \frac{\sum_{n=1}^{n=m} |E(\omega_{h_n|e}) - E(\omega_{h_n|\bar{e}})|}{2}$$

1) Example 1

Consider an exhaustive set of hypotheses $H=\{h_1, h_2, h_3\}$, and the respective expectations of their conditionals with respect to a item of evidence, e to be:

$E(\omega_{h_1|e_1})=1.0 \; E(\omega_{h_1|\bar{e}})=0.0$ $E(\omega_{h_2|e_2})=0.0 \; E(\omega_{h_2|\bar{e}})=0.35$ $E(\omega_{h_3|e_3})=0.0 \; E(\omega_{h_3|\bar{e}})=0.65$ Since both the sums of the positive conditionals and the sums of the negative conditionals of H add up to 1, i.e.:

$$\sum_{n=1}^{n=3} E(\omega_{h_n|e}) = 1, \quad \sum_{n=1}^{n=3} E(\omega_{h_n|\bar{e}}) = 1$$

and therefore the mean of the difference between the positive and negative conditionals is zero, and the um of all conditionals is exactly 2, i.e.

$D_{mean}(e, H)=0, E_{total}(e, H)=2$ it follows that the simplified form (A-14) can be used to obtain:

$$D(e, H) = \frac{|1.0 - 0| + |0 - 0.35| + |0 - 0.65|}{2} = 1.0$$

The diagnosticity of the evidence e in respect of all hypotheses is $D(e, H)=1.0$—since when the evidence is true, $h_1$ must be true and all other hypotheses ($h_2$, $h_3$) must be false. Furthermore, the diagnosticities with respect to the subsets of H (using A-13) are:

$D(e, \{h_1, h_2\})=1.0$ $D(e, \{h_2, h_3\})=0.3$ $D(e, \{h_1, h_3\})=1.0$ so that it can be seen that the evidence is capable of distinguishing perfectly between $h_1$ and $h_2$, and between $h_1$ and $h_3$, but cannot distinguish well between $h_2$ and $h_3$, (assuming $h_1$ is false).

2) Example 2

Consider another exhaustive set of hypotheses $H=\{h_1, h_2, h_3, h_4\}$, and the respective expectations of their conditionals with respect to a item of evidence, x to be:

$E(\omega_{h_1|e})=0.5 \; E(\omega_{h_1|\bar{e}})=0.1$ $E(\omega_{h_2|e})=0.2 \; E(\omega_{h_2|\bar{e}})=0.0$ $E(\omega_{h_3|e})=0.15 \; E(\omega_{h_3|\bar{e}})=0.5$ $E(\omega_{h_4|e})=0.15 \; E(\omega_{h_1|\bar{e}})=0.4$ The diagnosticity of the evidence e with respect to a subset of the hypotheses $H' \subset H$, $H'=\{h_1, h_{12}, h_3\}$ will be $D(e, H')$ and since both the sums of the positive conditionals and the sums of the negative conditionals of H' do not add up to 1, i.e.

$$\sum_{n=1}^{n=3} E(\omega_{h_n|e}) = 0.85, \quad \sum_{n=1}^{n=3} E(\omega_{h_n|\bar{e}}) = 0.6$$

and therefore $D_{mean}(e, H') = 0.25, \quad E_{total}(e, H') = 1.45$ it follows that the more usual form (A-13) must be used to obtain D(e, H'):

$$D(e, H') = \frac{|(0.5 - 0.1 - 0.083| + |0.2 - 0.0 - 0.083| + |0.15 - 0.5 - 0.083|}{1.45} = 0.6$$

with the diagnosticities with respect to the subsets of J' being:

$$D(e, \{h_1, h_2\}) = 0.25$$

$$D(e, \{h_2, h_3\}) = 0.65$$

$$D(e, \{h_1, h_3\}) = 0.3$$

E. Relevance

Relevance is a measure of how relevant the evidence is for determining the likelihood to a hypothesis, based on knowledge of the logical conditionals $p(h_i|e)$ and $p(h_i|\bar{e})$.

Theorem 1.9 (Relevance of evidence): The relevance of evidence e with respect to a single hypothesis h is defined as the difference between its conditionals $(e, \bar{e})$ $$R(e, h) = |p(h|e) - p(h|\bar{e})|.$$

It can be seen that $R(e, h) \in [0,1]$, where $R(e, h) = 0$ expresses total irrelevance/independence, and $R(e, h) = 1$ expresses total relevance/dependence between e and h. For belief conditionals, the same type of relevance can be defined being equivalent to the diagnosticity of evidence e with respect to a single hypothesis $h_i$ and its complement $\bar{h}_i$.

$$R(e, h_i) = D(e, \{h_1, \bar{h}_i\}) = |E(\omega_{h_i|e}) - E(\omega_{h_i|\bar{e}})| \quad \text{(A-16)}$$

Proof. Let $\Phi = \{h_1, h_2, \ldots h_m\}$ be a state space for a set m hypotheses. Let $\Omega^\Phi = \{\theta_1, \theta_2, \ldots \theta_m\}$ be the corresponding set of m state spaces for a single item of evidence x (where $\theta_i = \{x, T\}$) that represent the conditionals $\omega_{h_i|e}$, $\omega_{h_i|\bar{e}}$ for each hypothesis $h_i$.

Then, the diagnosticity for a single hypothesis $h_i \in \Phi$ and its complement $\bar{h}_i = \Phi \setminus \{h_i\} = \{h_1, h_2, \ldots h_m\} \setminus \{h_i\}$ (with k=m−1 elements), can be defined by the diagnosticity of the set $Q = \{h_i, \bar{h}_i\}$ where the conditionals for $\bar{h}_i$ are defined as $$E(\omega_{\bar{h}_i|e}) = \sum_{n=1}^{n=k} E(\omega_{h_k|e}), \text{ and } E(\omega_{\bar{h}_i|\bar{e}}) = \sum_{n=1}^{n=k} E(\omega_{h_k|\bar{e}})$$

It can be shown from A-14 that $Q = \{h_i, \bar{h}_i\}$ form a complete set of hypotheses since both $D_{mean}(e, Q) = 0$ (A-11) and $E_{total}(e, Q) = 2$ Therefore, the simplified form for D(e, Q) can be used (A-14), i.e.

$$D(e, Q) = D(e, \{h_i, \bar{h}_i\})$$

$$= \frac{\sum_{n=1}^{n=k} |E(\omega_{h_n|e}) - E(\omega_{h_n|\bar{e}})|}{2}$$

$$= \frac{|E(\omega_{h_i|e}) - E(\omega_{h_i|\bar{e}})| - |E(\omega_{\bar{h}_i|e}) - E(\omega_{\bar{h}_i|\bar{e}})|}{2}$$

$$= \frac{2|E(\omega_{h_i|e}) - E(\omega_{h_i|\bar{e}})|}{2}$$

$$= |E(\omega_{h_i|e}) - E(\omega_{h_i|\bar{e}})|$$

$$= R(e, h_i)$$

F. Normalised Diagnosticity

When considering a multi-dimensional problem with multiple items of evidence and multiple hypotheses, it is useful to consider the diagnosticity of evidence relative to the diagnosticity of all other evidence, rather than its actual diagnosticity (see 1.6).

Definition 1.10 (Normalised Diagnosticity): Let the set of k items of evidence be $\Psi = \{e_1, e_2, \ldots e_k\}$, and a set of m hypotheses $\Phi = \{h_1, h_2, \ldots h_m\}$ and where the maximum of the evidence diagnosticities $D_{max}$ is defined as:

$$D_{max}(\Psi, \Phi) = \max_{n=1}^{n=k}[D(e_n, \Phi)] \quad \text{(A-17)}$$

Then the normalised diagnosticity $D_{normal}$ for each item of evidence $e_i \in \Psi$ be defined as the the diagnosticity $D(e_i, \Phi)$ divided by the maximum of the evidence diagnosticities, $D_{max}$ i.e:

$$D_{normal}(e_i, \Phi) = \begin{cases} D_{max}(\Psi, \Phi) = 0, & 0; \\ D_{max}(\Psi, \Phi) > 0, & \dfrac{D(e_i, \Phi)}{D_{max}(\Psi, \Phi)}. \end{cases} \quad \text{(A-18)}$$

We claim:

1. A computer implemented method of analysis of competing hypotheses in estimative intelligence, said method comprising the steps of:
    a. deciding on a plurality of possible hypotheses to be considered;
    b. identifying significant items of evidence for and against each of said plurality of hypotheses;
    c. configuring a processor to construct and store onto a memory a model for analyzing the hypotheses by:
        i. producing a set of exhaustive and exclusive hypotheses, wherein only one hypothesis may be true;
        ii. assessing and assigning base rates for each hypothesis;
        iii. determining from said significant items of evidence identified in relation to respective hypotheses a set of items of evidence that are relevant to, have a causal influence on or would disconfirm more than one hypothesis;
        iv. assessing and assigning base rates for each item of evidence;
        v. deciding for each item of evidence whether the item should be treated as being a causal influence or diagnostic indicator with respect to the set of the hypotheses;
        vi. if the item of evidence is to be treated as a causal influence, making a judgment as to the likelihood of each hypothesis:
            A. if the evidence were true, and
            B. if the evidence were false;
        vii. if the item of evidence is to be treated as a diagnostic indicator, making a judgment as to the likelihood of the evidence being true:
            A. if the hypothesis were true;
    d. assessing the belief for each item of evidence being true;
    e. deciding a set of interim beliefs in each hypothesis for each individual item of evidence by:
        i. employing a conditional inference operator for evidence that is to be treated as a causal influence; and ii. employing a reverse conditional inference operator for evidence that is to be treated as a diagnostic indicator;

f. deciding the overall belief in each hypothesis by employing a consensus operator on the respective set of interim beliefs; and g. outputting a set of beliefs representing the certainty and likelihood of each hypothesis.

2. The analysis method of claim 1 wherein the step of identifying the set of significant items of evidence is not limited to what evidence is already known or believed to be discoverable.

3. The analysis method of claim 1 wherein the steps of assigning base rates to hypotheses and to the items of evidence involves assigning prior probabilities to each hypothesis and to each item of evidence, respectively.

4. The analysis method of claim 1 wherein competing hypotheses in the set are alternative explanations of the evidence.

5. The analysis method of claim 1 wherein the evidence includes possible causal influences and diagnostic indicators for one or more of the hypotheses.

6. The analysis method of claim 1 wherein the belief for an item of evidence being true includes both the certainty and likelihood of the item of evidence being true.

7. The analysis method of claim 6 wherein the likelihood of the belief an item of evidence or hypothesis being true expresses the probability of the item of evidence being true.

8. The analysis method of claim 6 wherein the certainty of the belief an item of evidence or hypothesis being true expresses the strength of the claim about the assigned likelihood being accurate.

9. The analysis method of claim 1 wherein deciding the belief in each interim hypothesis for each item of evidence is considered apart from the general set of evidence under consideration in relation to the hypothesis.

10. The analysis method of claim 1 wherein the model is comprised of a set of conditionals for all items of evidence and the hypotheses, wherein said model can be used to evaluate a complete or incomplete set of evidence by inputting a set of observable evidence together with expressions of vacuous beliefs where no data is available.

11. A system for analyzing a set of exhaustive and exclusive hypotheses in estimative intelligence, said system comprising:

at least one processor for executing instructions, a memory coupled to the processor, a data storage system for reading media having sequences of instructions stored thereon coupled to the data storage system, input/output for delivering data to and from the memory or to and from the data storage system and a user interface allowing for interaction with said instruction sequences by users, which sequences also causes said at least one processor to execute the steps of:

assessing and assigning base rates for each hypothesis;

determining a set of items of evidence that are relevant to, have a causal influence on or would disconfirm more than one hypothesis;

assessing and assigning base rates for each item of evidence;

deciding, for each item of evidence, whether the item should be treated as being a causal influence or diagnostic indicator with respect to the set of the hypotheses;

if the item of evidence is to be treated as a causal influence, making a judgment as to the likelihood of each hypothesis, both if the evidence were true, and also if the evidence were false;

if the item of evidence is to be treated as a diagnostic indicator, making a judgment as to the evidence being true if the hypothesis were true;

assessing the belief for each item of evidence being true;

deciding a set of interim beliefs in each hypothesis for each individual item of evidence by:

employing a conditional inference operator for evidence that is to be treated as a causal influence; and employing a reverse conditional inference operator for evidence that is to be treated as a diagnostic indicator;

deciding the overall belief in each hypothesis by employing a consensus operator on the respective set of interim beliefs; and outputting a set of beliefs representing the certainty and likelihood of each hypothesis.

12. The estimative intelligence analysis system of claim 11 wherein the step of identifying the set of significant items of evidence is not limited to what evidence is already known or believed to be discoverable.

13. The estimative intelligence analysis system of claim 11 wherein the steps of assigning base rates to hypotheses and to the items of evidence involves assigning prior probabilities to each hypothesis and to each item of evidence, respectively.

14. The estimative intelligence analysis system of claim 11 wherein competing hypotheses in the set are alternative explanations of the evidence.

15. The estimative intelligence analysis system of claim 11 wherein the evidence includes possible causal influences and diagnostic indicators for one or more of the hypotheses.

16. The estimative intelligence analysis system of claim 11 wherein the belief for an item of evidence being true includes both the certainty and likelihood of the item of evidence being true.

17. The estimative intelligence analysis system of claim 16 wherein the likelihood of the belief an item of evidence or hypothesis being true expresses the probability of the item of evidence being true.

18. The estimative intelligence analysis system of claim 16 wherein the certainty of the belief an item of evidence or hypothesis being true expresses the strength of the claim about the assigned likelihood being accurate.

19. The estimative intelligence analysis system of claim 11 wherein deciding the belief in each interim hypothesis for each item of evidence is considered apart from the general set of evidence under consideration in relation to the hypothesis.

20. The estimative intelligence analysis system of claim 11 wherein the model is comprised of a set of conditionals for all items of evidence and the hypotheses, wherein said model can be used to evaluate a complete or incomplete set of evidence by inputting a set of observable evidence together with expressions of vacuous beliefs where no data is available.

21. A computer program product for analysis of competing hypotheses in estimative intelligence, the computer program product comprising:

computer-readable storage media having computer-readable sequences of instructions stored on the computer-readable storage media, wherein the sequences of instructions comprise:

first instructions configured to decide on a plurality of possible hypotheses to be considered;

second instructions configured to identify significant items of evidence for and against each of said plurality of hypotheses;

third instructions configured to construct a model for analyzing the hypotheses by:

i. producing a set of exhaustive and exclusive hypotheses, wherein only one hypothesis may be true;

ii. assessing and assigning base rates for each hypothesis;

iii. determining from said significant items of evidence identified in relation to respective hypotheses a set of items of evidence that are relevant to, have a causal influence on or would disconfirm more than one hypothesis;
iv. assessing and assigning base rates for each item of evidence;
v. deciding for each item of evidence whether the item should be treated as being a causal influence or diagnostic indicator with respect to the set of the hypotheses;
vi. if the item of evidence is to be treated as a causal influence, making a judgment as to the likelihood of each hypothesis:
A. if the evidence were true, and
B. if the evidence were false; and
vii. if the item of evidence is to be treated as a diagnostic indicator, making a judgment as to the likelihood of the evidence being true:
A. if the hypothesis were true;

fourth instructions configured to access the belief for each item of evidence being true;
fifth instructions configured to decide a set of interim beliefs in each hypothesis for each individual item of evidence by:
i. employing a conditional inference operator for evidence that is to be treated as a causal influence; and
ii. employing a reverse conditional inference operator for evidence that is to be treated as a diagnostic indicator;
sixth instructions configured to decide the overall belief in each hypothesis by employing a consensus operator on the respective set of interim beliefs; and
seventh instructions configured to output a set of beliefs representing the certainty and likelihood of each hypothesis.

* * * * *

UNITED STATES PATENT AND TRADEMARK OFFICE
CERTIFICATE OF CORRECTION

PATENT NO. : 7,720,787 B2  Page 1 of 1
APPLICATION NO. : 11/423436
DATED : May 18, 2010
INVENTOR(S) : Pope et al.

It is certified that error appears in the above-identified patent and that said Letters Patent is hereby corrected as shown below:

On the Title page,

Item (75) Inventors, "The Gap (AU)" should read --Queensland (AU)--;

Item (73) Assignee, "Varsity Lake Old" should read --Varsity Lakes Qld--.

Column 12,

Lines 36 and 37, "http://www.odci.gov/csi/kent csi/pdflv16i2a03d.pdf" should read --http://www.odci.gov/csi/kent csi/pdf/v16i2a03d.pdf--.

Column 19,

Line 40, "12004" should read --2004--.

Signed and Sealed this

Fourteenth Day of September, 2010

David J. Kappos
*Director of the United States Patent and Trademark Office*